United States Patent
Kobayashi et al.

(10) Patent No.: US 11,185,977 B2
(45) Date of Patent: Nov. 30, 2021

(54) INFORMATION PROCESSING APPARATUS, GRASPING SYSTEM, AND INFORMATION PROCESSING METHOD

(71) Applicant: CANON KABUSHIKI KAISHA, Tokyo (JP)

(72) Inventors: Toshihiro Kobayashi, Tokyo (JP); Kazuhiko Kobayashi, Yokohama (JP); Masakazu Fujiki, Kawasaki (JP); Akihiro Katayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 342 days.

(21) Appl. No.: 16/171,750

(22) Filed: Oct. 26, 2018

(65) Prior Publication Data
US 2019/0126471 A1 May 2, 2019

(30) Foreign Application Priority Data
Nov. 2, 2017 (JP) .............................. JP2017-212900

(51) Int. Cl.
*B25J 9/16* (2006.01)
*B25J 15/06* (2006.01)
*B25J 19/04* (2006.01)

(52) U.S. Cl.
CPC ............. *B25J 9/163* (2013.01); *B25J 9/1612* (2013.01); *B25J 9/1669* (2013.01); *B25J 9/1697* (2013.01); *B25J 15/0683* (2013.01); *B25J 19/04* (2013.01)

(58) Field of Classification Search
CPC ............... B25J 9/16; B25J 15/06; B25J 19/04
See application file for complete search history.

(56) References Cited

U.S. PATENT DOCUMENTS

| | | | |
|---|---|---|---|
| 4,886,943 A | 12/1989 | Suzuki |
| 4,887,245 A | 12/1989 | Mori |
| 4,910,363 A | 3/1990 | Kobayashi |
| 4,931,965 A | 6/1990 | Kaneko |
| 4,980,518 A | 12/1990 | Kobayashi |
| 5,070,325 A | 12/1991 | Tanaka |
| 5,097,102 A | 3/1992 | Yoshimura |
| 5,142,106 A | 8/1992 | Yoshimura |
| 5,239,138 A | 8/1993 | Kobayashi |

(Continued)

FOREIGN PATENT DOCUMENTS

JP         2017-30135       2/2017

OTHER PUBLICATIONS

U.S. Appl. No. 16/163,745, filed Oct. 18, 2018, by Takayuki Yamada et al.

*Primary Examiner* — Kira Nguyen
(74) *Attorney, Agent, or Firm* — Venable LLP

(57) ABSTRACT

It is an object to enable a grasping operation to be executed according to a state of an object. The invention provides an information processing apparatus which determines the grasping operation in a grasping unit for grasping the object. The information processing apparatus has: an obtaining unit for obtaining an image acquired by capturing the object; a recognizing unit for recognizing a state of the object from the image obtained by the obtaining unit; and a generating unit for generating information for allowing the grasping unit to execute the grasping operation on the basis of the object state recognized by the recognizing unit and conditions to execute the grasping operation.

20 Claims, 13 Drawing Sheets

(56) References Cited

U.S. PATENT DOCUMENTS

| | | | |
|---|---|---|---|
| 5,500,492 A | 3/1996 | Kobayashi | |
| 5,539,678 A | 7/1996 | Tanaka | |
| 5,565,893 A | 10/1996 | Sato | |
| 5,714,698 A | 2/1998 | Tokioka | |
| 5,726,686 A | 3/1998 | Taniishi | |
| 5,736,979 A | 4/1998 | Kobayashi | |
| 5,805,147 A | 9/1998 | Tokioka | |
| 5,818,429 A | 10/1998 | Tanaka | |
| 5,831,603 A | 11/1998 | Yoshimura | |
| 5,936,207 A | 8/1999 | Kobayashi | |
| 6,141,170 A | 10/2000 | Hatae | |
| 6,415,240 B1 | 7/2002 | Kobayashi | |
| 6,636,199 B2 | 10/2003 | Kobayashi | |
| 6,774,898 B1 | 8/2004 | Katayama | |
| 6,862,019 B2 | 3/2005 | Kobayashi | |
| 6,943,829 B2 | 9/2005 | Endo | |
| 7,075,524 B2 | 7/2006 | Kobayashi | |
| 7,110,592 B2 | 9/2006 | Kotake | |
| 7,251,741 B2 | 7/2007 | Kobayashi | |
| 7,456,523 B2 | 11/2008 | Kobayashi | |
| 7,486,281 B2 | 2/2009 | Kobayashi | |
| 7,965,904 B2 | 6/2011 | Kobayashi | |
| 8,554,359 B2 * | 10/2013 | Ichimaru | G05B 19/401 700/214 |
| 8,660,685 B2 * | 2/2014 | Irie | B25J 9/1697 700/213 |
| 8,687,057 B2 | 4/2014 | Kobayashi | |
| 9,156,162 B2 * | 10/2015 | Suzuki | B25J 9/1697 |
| 10,434,652 B2 * | 10/2019 | Ando | B25J 9/1697 |
| 2005/0200717 A1 | 9/2005 | Endo | |
| 2006/0104788 A1 * | 5/2006 | Ban | G06T 7/75 414/729 |
| 2007/0274812 A1 * | 11/2007 | Ban | B25J 9/1697 414/217 |
| 2008/0082213 A1 * | 4/2008 | Ban | G06T 7/73 700/260 |
| 2010/0004778 A1 * | 1/2010 | Arimatsu | B25J 9/1697 700/214 |
| 2011/0222995 A1 * | 9/2011 | Irie | B25J 9/1687 414/225.01 |
| 2013/0238125 A1 * | 9/2013 | Suzuki | B25J 9/1612 700/253 |
| 2013/0245828 A1 * | 9/2013 | Tateno | G06T 7/75 700/259 |
| 2013/0343640 A1 * | 12/2013 | Buehler | G06N 20/00 382/155 |
| 2014/0081452 A1 * | 3/2014 | Ito | B25J 9/1669 700/245 |
| 2014/0365010 A1 * | 12/2014 | Yasuda | H04N 7/183 700/259 |

\* cited by examiner

INFORMATION PROCESSING APPARATUS, GRASPING SYSTEM, AND INFORMATION PROCESSING METHOD

BACKGROUND OF THE INVENTION

Field of the Invention

The present invention relates to an information processing apparatus, a grasping system, an information processing method, and a storage medium.

Description of the Related Art

In recent years, such an apparatus that, to objects such as parts or the like disposed at random, a command for controlling a robot hand is generated from an image captured by an imaging apparatus and the object is properly grasped by using a robot arm and the hand has been proposed.

According to Japanese Patent Application Laid-Open No. 2017-30135, a learning for outputting a control command for enabling a grasping unit to grasp an object is performed by using a method called an enforcement learning. A robot is made to grasp by using a captured image and three-dimensional data which were input as hints and a correspondence between a control value of the grasping unit at the time when the grasping is successful and the input data is learned.

However, in Japanese Patent Application Laid-Open No. 2017-30135, since the grasping is unconditionally performed to the captured image and the three-dimensional data which were input, the grasping operation according to a state of the object cannot be executed.

The present invention has been completed in consideration of the foregoing problem and it is an object of the invention to enable the grasping operation to be executed in accordance with a state of an object.

SUMMARY OF THE INVENTION

According to an aspect of the invention, there is provided an information processing apparatus which determines a grasping operation in a grasping unit for grasping an object, comprising: an obtaining unit configured to obtain an image acquired by capturing the object; a recognizing unit configured to recognize a state of the object from the image obtained by the obtaining unit; and a generating unit configured to generate information for allowing the grasping unit to execute the grasping operation on the basis of the state of the object recognized by the recognizing unit and a condition adapted to execute the grasping operation.

According to the invention, the grasping operation can be executed in accordance with the state of the object.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

In the first embodiment, an apparatus which can be applied to a case where, from objects such as a plurality of parts or the like disposed at arbitrary position orientations, the contents of the grasping operation are determined in accordance with a state of the object and the grasping is performed by using a grasping unit attached to a robot arm or the like will be described.

In the embodiment, an image and a depth image which were captured by an imaging unit are input, a recognizing unit detects a state of a grasping object, and at the same time, control parameters for driving a grasping unit are output. An operation generating unit compares the detected state of the grasping object with a grasping condition which was previously defined and determines the optimum grasping operation on the basis of the control parameters which were output by the recognizing unit. The grasping unit executes the determined grasping operation. The grasping operation is not simply determined by the state of the object in accordance with whether or not a grasping success rate is high. If the object is grasped in the present state of the object, there is a case where a required time of the associating operation in a post step becomes long. Therefore, the grasping operation is determined by the previously defined grasping condition in consideration of the required time of the associating operation in the post step. Thus, the contents of the grasping operation are switched in accordance with the state of the grasping object and the optimum grasping operation can be executed. "Grasping" incorporates not only a concept in the embodiments but also a concept such as gripping (for example, an object is gripped or sandwiched by a plurality of fingers) or holding (for example, an object is suctioned by using a vacuum or an electromagnetic force).

Figure 1:
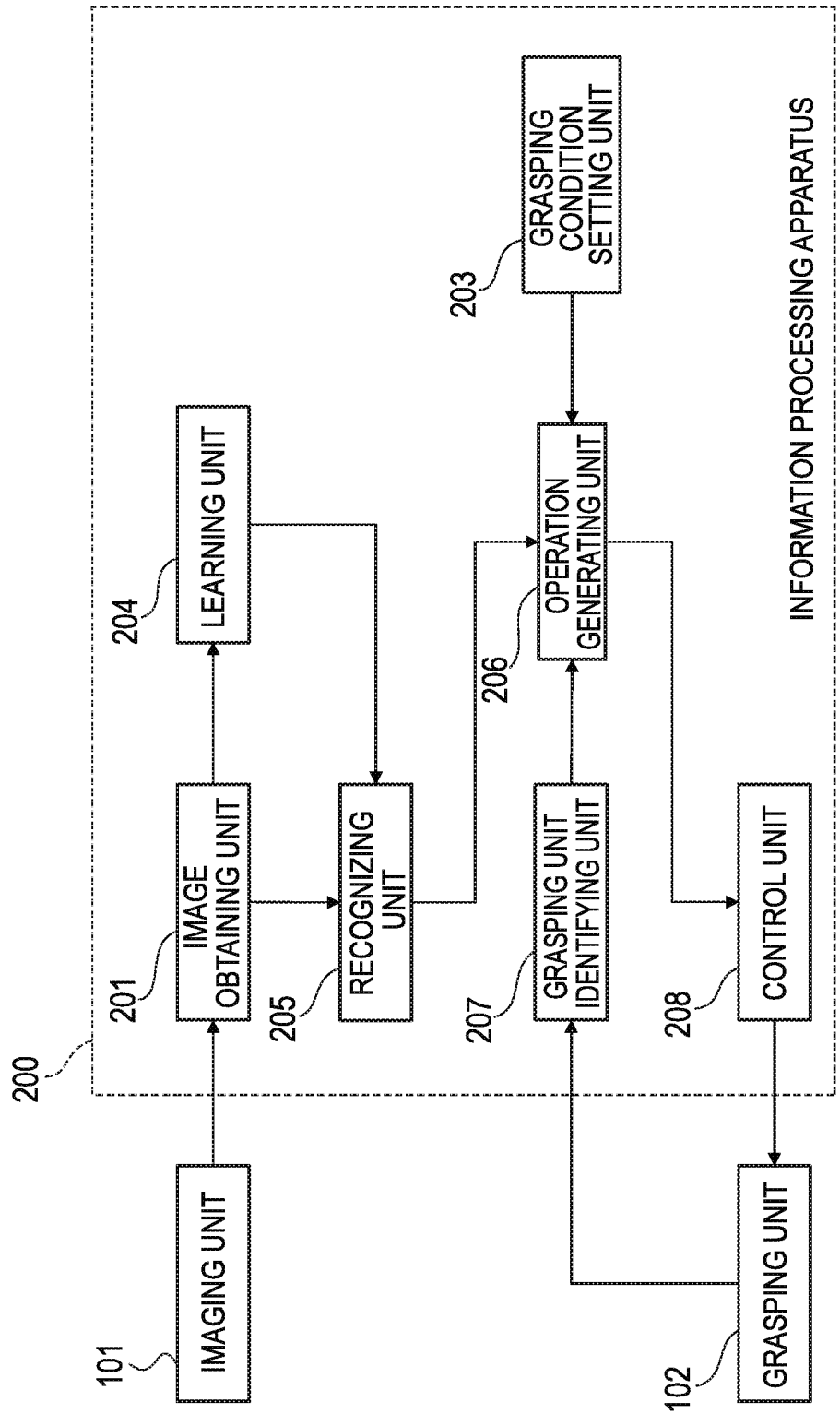
FIG. 1 is a diagram illustrating a whole construction of a grasping system of the first embodiment.

FIG. 1 is a diagram illustrating an example of a whole construction of a grasping system (robot apparatus) according to the embodiment.

The grasping system has an imaging (capturing) unit 101, a grasping unit 102, and an information processing apparatus 200.

The imaging unit 101 captures an image (hereinbelow, referred to as a captured image) and a depth image as a scene in which a plurality of grasping objects (objects) 301 are arranged. The imaging unit 101 transmits the captured image and depth image to the information processing apparatus 200. The depth image is an image including information (depth information) of a distance from the imaging unit 101 to each pixel of the captured image.

The grasping unit 102 grasps one of the plurality of arranged grasping objects 301, moves to a different position, and arranges. The embodiment will be described on the assumption that two kinds of "suction cup" and "tweeze-type gripper" are used as a grasping unit 102.

Figure 2:
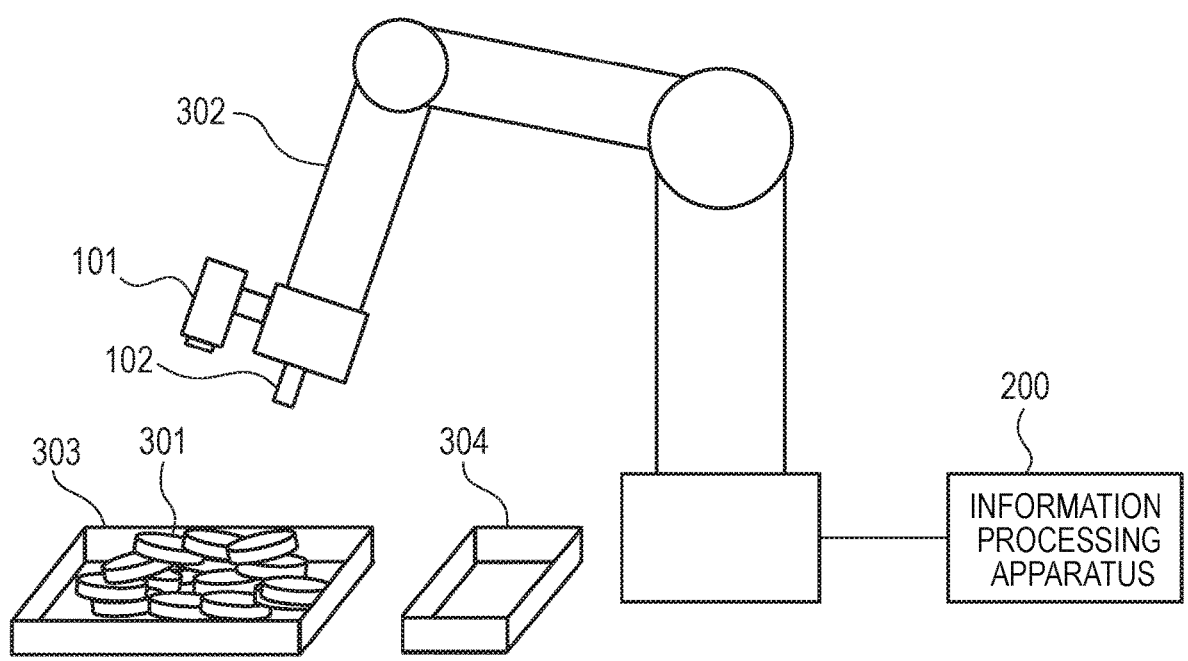
FIG. 2 is a diagram illustrating a schematic construction of the grasping system.

FIG. 2 is a diagram illustrating an example of a schematic construction of the grasping system.

In the grasping system, the imaging unit 101 and the grasping unit 102 are attached to front edges of a robot arm 302. In this instance, the grasping objects 301 such as a plurality of parts or the like are disposed like a mountain in a supply tray 303 at arbitrary position orientations. The imaging unit 101 captures a scene in which the plurality of grasping objects 301 were arranged. The grasping unit 102 grasps one of the plurality of grasping objects 301 on the basis of control from the information processing apparatus 200. After the robot arm 302 moved the grasping object 301 to a predetermined position in an ejection tray 304, the grasping unit 102 releases the grasping object 301 and arranges into the ejection tray 304.

Returning to FIG. 1, a functional construction of the information processing apparatus 200 will be described.

The information processing apparatus 200 has an image obtaining unit 201, a grasping condition setting unit 203, a learning unit 204, a recognizing unit 205, an operation generating unit 206, a grasping unit identifying unit 207, and a control unit 208. Each unit of the information processing apparatus 200 is constructed by, for example, a method whereby a CPU executes a program stored in a storage device or the like.

The image obtaining unit 201 obtains the captured image and depth image captured by the imaging unit 101. The grasping condition setting unit 203 sets a grasping condition 500 as a data structure in which a state of the grasping object 301 and conditions for allowing the grasping unit 102 to perform the grasping have been made to correspond. The grasping according to the state of the grasping object 301, the operation associated with the grasping, and the like are described in the grasping condition 500.

Figure 3:
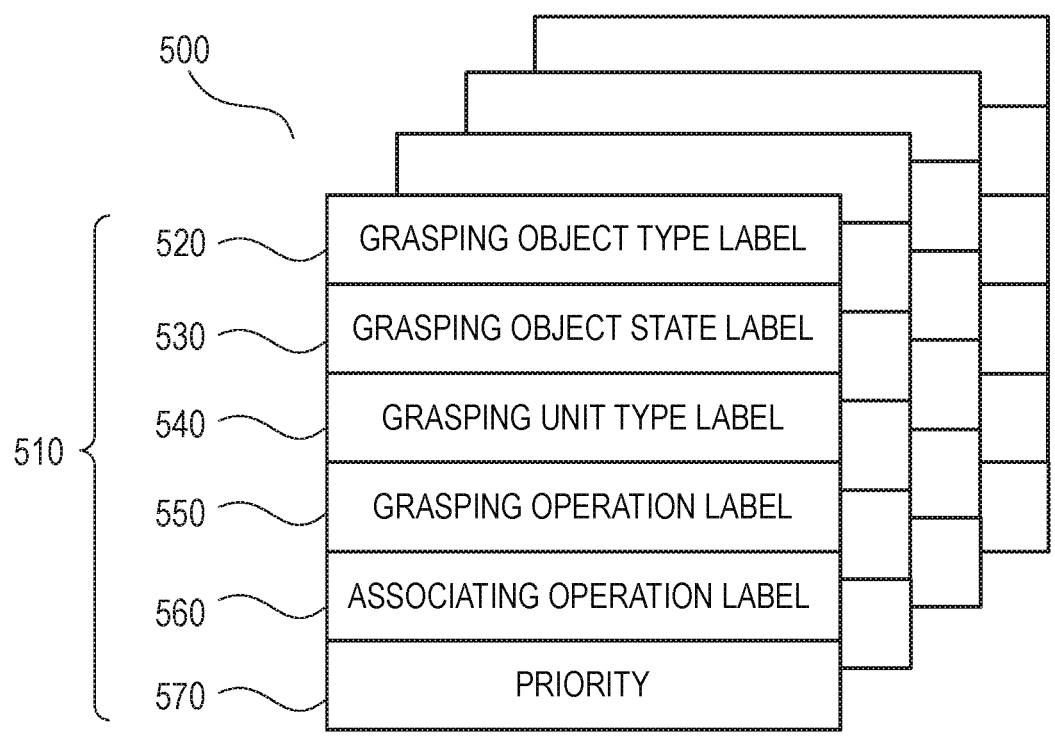
FIG. 3 is a diagram for describing a data construction of a grasping condition.

FIG. 3 is a diagram for describing an example of a data construction of the grasping condition 500.

The grasping condition 500 is constructed by a set of one or more grasping condition elements 510. Each grasping condition element 510 is constructed by a grasping object type label 520, a grasping object state label 530, a grasping unit type label 540, a grasping operation label 550, an associating operation label 560, and a priority 570.

The grasping object type label 520 is a label showing a type of grasping object 301. The type of grasping object 301 is a unit of a group of objects having the same shape or same external appearance. In the case of industrial parts, the type of grasping object 301 is the same as a kind of part.

The grasping object state label 530 is a label for identifying the state of the grasping object 301. Conditions for validating the grasping condition element 510 are described in the grasping object state label 530. In the embodiment, available orientation in a three-dimensional space of the grasping object 301 is classified into a front surface, a back surface, and a side surface and it is defined as a state of the grasping object 301. For example, values 1 to 3 corresponding to those orientations are set into the grasping object state label 530. The state of the grasping object 301 is recognized by the recognizing unit 205. When the state of the grasping object 301 coincides with the state described in the grasping object state label 530, the grasping condition element 510 is valid. Such a process will be described hereinafter.

The grasping object state label 530 can have not only a single value but also a plurality of values. In the embodiment, if the same process is executed to the grasping object 301 with respect to the case of the front surface and the case of the back surface, for example, both of the values of 1 and 2 are set into the grasping object state label 530. If no value is set into the grasping object state label 530, the grasping condition element 510 is validated only when all of the conditions described in the grasping object state label 530 in the other grasping condition elements 510 are not satisfied. That is, when the grasping object state label 530 is blank, it is handled as "another" condition.

The grasping unit type label 540 is a label for uniformly identifying the type of grasping unit 102. In the embodiment, a label for identifying "suction cup" or "tweeze-type gripper" is set into the grasping unit type label 540. "suction cup" or "tweeze-type gripper" corresponds to an example of the grasping unit.

The grasping operation label 550 is a label for describing whether or not the grasping unit 102 executes the grasping in the state of the grasping object 301 and the grasping unit type. In the embodiment, a label corresponding to "grasp" or "not grasp" is set into the grasping operation label 550.

The associating operation label 560 is a label for describing the operation associated with the grasping operation. In the embodiment, a label corresponding to "put to the center in the ejection tray 304" or "reverse (turn over) the orientation of the grasping object 301" is set as an associating operation. A command for the actual associating operation which is executed by the grasping unit 102 is generated by the operation generating unit 206 and control unit 208, which will be described hereinafter. Therefore, only the labels for identifying those associating operations are set into the associating operation label 560.

The priority 570 is provided to designate a priority at which the grasping unit 102 grasps among the plurality of grasping condition elements 510. In the embodiment, the priority 570 is set based on a grasping success rate in the relevant grasping condition element 510. That is, the higher the grasping success rate of the grasping condition element 510 is, the higher the priority 570 is set. The longer a required time of the associating operation is, the lower the priority 570 is set. The shorter the required time of the associating operation is, the higher the priority 570 is set. Thus, the occurrence of the associating operation is suppressed. It is assumed that if the associating operation label 560 is not described, the associating operation does not occur and there is no required time of the associating operation.

In the embodiment, the user preliminarily makes the grasping condition 500 by using an input device or display device (not shown).

Figure 4:
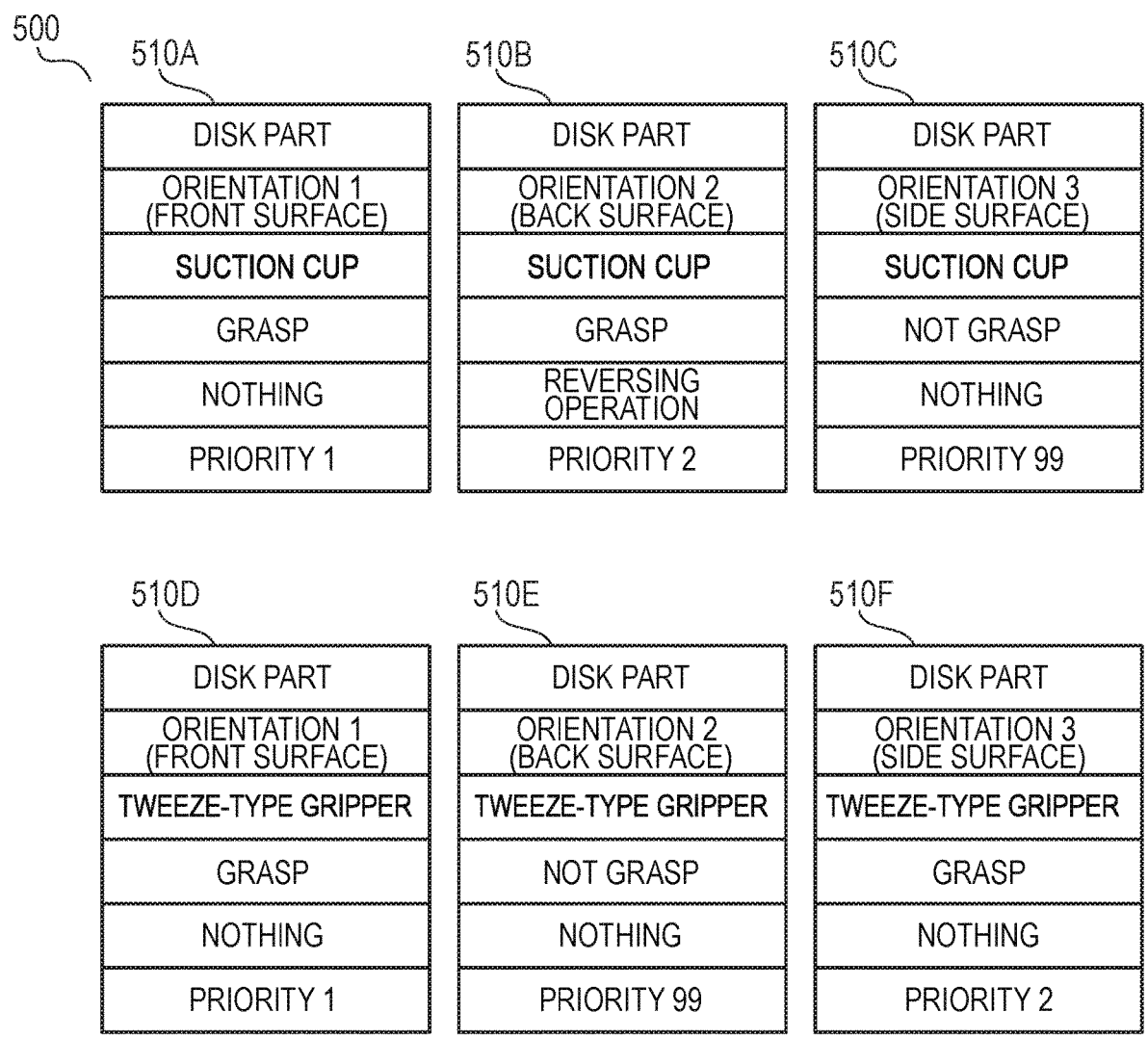
FIG. 4 is a diagram illustrating schematic examples of the grasping condition.

FIG. 4 is a diagram illustrating schematic examples of the grasping condition 500.

Examples of a plurality of grasping condition elements 510A to 510F are shown here. The plurality of grasping condition elements 510 set by the grasping condition setting unit 203 are preliminarily stored in the storage device.

Returning to FIG. 1, the functional construction of the information processing apparatus 200 will be described.

The learning unit 204 generates recognition data which is used by the recognizing unit 205. Specifically speaking, when the captured image and depth image are input to the recognizing unit 205, the learning unit 204 generates the recognition data for allowing the recognizing unit 205 to output the optimum grasping object type label, grasping object state label, and control parameters of the grasping unit 102. In the embodiment, the learning and recognition are performed by CNN (Convolutional Neural Network). The recognition data in the embodiment is constructed by a model structure of CNN and a weight parameter of each node. The control parameters of the grasping unit 102 are a command set comprising designation values of a current, a voltage, and the like which are applied to a manipulator and an actuator when the grasping unit 102 is allowed to execute the grasping operation and their timing.

The recognizing unit 205 executes the recognizing process by CNN on the basis of the recognition data to the captured image and depth image which were input and recognizes the type and state of the grasping object 301. The recognizing unit 205 converts the recognition result into a type label and an orientation label. The type label corresponds to the grasping object type label 520. The orientation label corresponds to the grasping object state label 530. The recognizing unit 205 outputs the type label, the orientation label, and the control parameters of the grasping unit 102.

The operation generating unit 206 generates the grasping operation of the grasping unit 102 with reference to the grasping condition 500 and control parameters of the grasping unit 102 corresponding to the type label and orientation label which were output by the recognizing unit 205.

The grasping unit identifying unit 207 identifies the grasping unit of the grasping unit 102. The grasping unit identifying unit 207 receives a signal for identifying the grasping unit from the grasping unit 102, converts into the same value as the grasping unit type label 540, and outputs to the operation generating unit 206.

The control unit 208 generates a control command for driving the grasping unit 102 on the basis of the grasping operation generated by the operation generating unit 206 and controls the grasping unit 102.

Figure 5A:
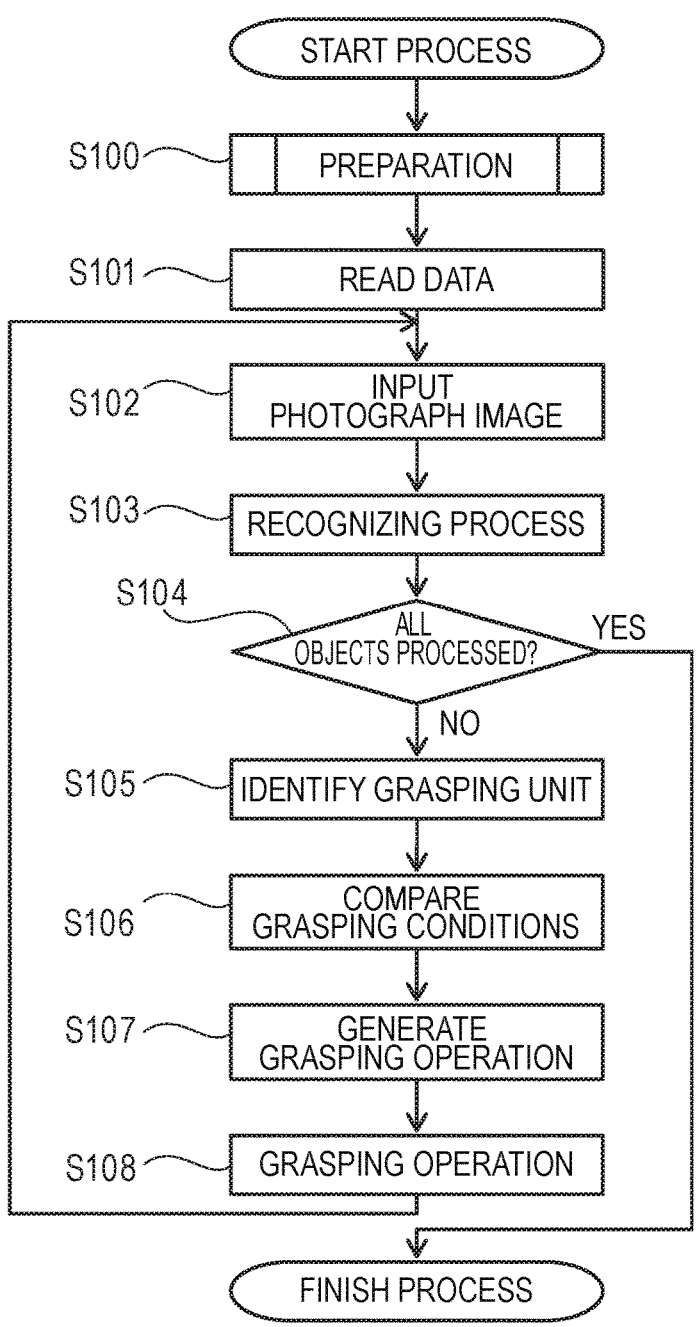
FIGS. 5A and 5B are flowcharts showing processes of an information processing apparatus.
Figure 5B:
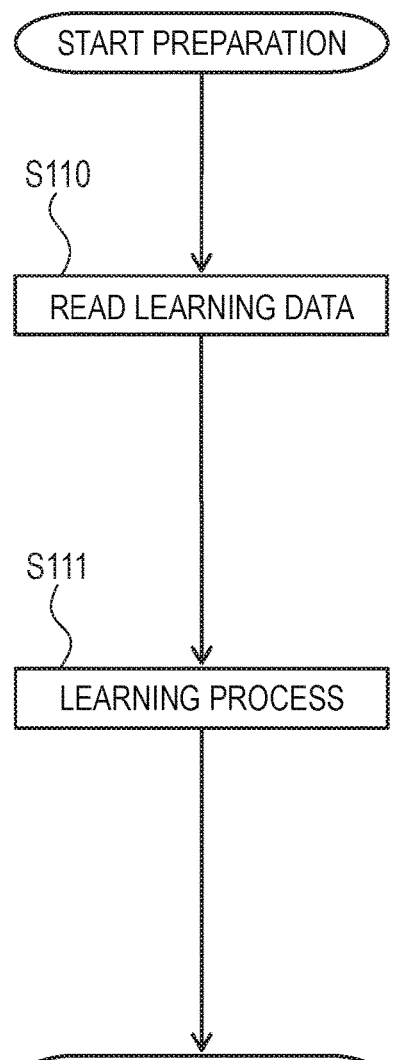

Subsequently, an example of processes of the information processing apparatus 200 of the embodiment will be described with reference to flowcharts of FIGS. 5A and 5B. FIG. 5A is the flowchart showing the whole process. FIG. 5B is the flowchart regarding a preparation of step S100. The flowcharts of FIGS. 5A and 5B are realized by, for example, a method whereby the CPU of the information processing apparatus 200 executes the programs stored in the storage device or the like.

(S100)

The learning unit 204 executes a preparation. Specifically speaking, the learning unit 204 previously makes a plurality of captured images and a plurality of depth images correspond to the state of the grasping object 301. When another captured image and depth image are input, the learning unit 204 generates recognition data for allowing the proper state of the grasping object 301 and the control parameters for allowing the grasping unit 102 to grasp the grasping object 301 are output. When the recognition data is generated once, even in the case of repeatedly executing the processes of the embodiment, the process of S100 can be omitted.

The preparation process of S100 will now be described with reference to FIG. 5B.

(S110)

The learning unit 204 reads out learning data from the storage device. The user preliminarily makes the learning data by using the input device or display device.

The learning data in the embodiment is constructed by a set of combinations of the captured image and depth image and the type label and orientation label of the grasping object 301 which can be grasped among the grasping objects 301 displayed in the captured image. The type label of the grasping object 301 in the embodiment is a label for uniquely identifying the type of grasping object 301 and its available value is the same as the grasping object type label 520. The orientation label in the embodiment is an identification number at the time when the available orientation in the three-dimensional space of the grasping object 301 is classified into three kinds of "front surface", "back surface", and "side surface". Since the orientation label is directly compared with the grasping object state label 530, its available value is the same.

(S111)

The learning unit 204 performs the learning of CNN. This learning is further classified into two stages.

In the first learning, on the basis of the learning data which was read in S110, the learning unit 204 generates recognition data for identifying the type label and orientation label of the grasping object 301 to the captured image and depth image.

In the next learning, without using the learning data which was read in S110, the learning unit 204 generates recognition data for outputting the control parameters of the grasping unit 102 to the captured image and depth image. In this learning, a method called a grasping learning can be applied. In the grasping learning, the actual grasping is performed by the grasping unit 102 to the captured image and depth image which were input and the learning is performed on the basis of its result. When the grasping is successful, the learning is performed so as to output the control parameters at the time of recognition. When the sufficient learning is performed, by inputting the captured image and depth image to the recognizing unit 205, an area where it is determined that the success rate of the grasping is high in the captured image and the control parameters for grasping the grasping object 301 at that time are output.

In this manner, by performing two kinds of learning, when the captured image and depth image are input to the recognizing unit 205, the recognizing unit 205 can output the type label and orientation label of the grasping object 301 which can be grasped and the control parameters for grasping. The recognition data in the embodiment is data obtained by synthesizing the recognition data generated by the learning of two times.

Returning to the flowchart of FIG. 5A, the processes in S101 and subsequent steps will be described.

(S101)

The grasping condition setting unit 203 reads out the grasping condition 500 from the storage device. The learning unit 204 reads the recognition data generated in S100 and sets a model structure of CNN and a weight parameter of each node.

(S102)

The imaging unit 101 captures the captured image and depth image of the scene including the grasping object 301. The imaging unit 101 transmits the captured image and depth image to the image obtaining unit 201, so that the image obtaining unit 201 obtains the image data of the captured image and depth image.

Figure 6:
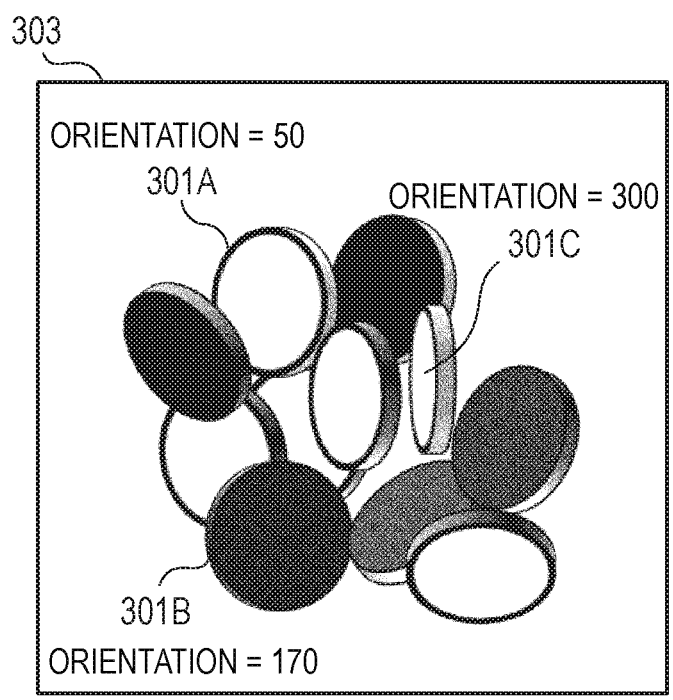
FIG. 6 is a diagram illustrating a captured image obtained by capturing a grasping object.

FIG. 6 is a diagram illustrating an example of the captured image. In this instance, a plurality of grasping objects 301 (301A to 301C) are disposed like a mountain. It is assumed that a white surface of the grasping object 301 is a front surface and a black surface is a back surface.

(S103)

The recognizing unit 205 obtains the captured image and depth image from the image obtaining unit 201. By applying CNN to the captured image and depth image, the recognizing unit 205 outputs the type label and orientation label of the grasping object 301 corresponding to the captured image and depth image. The type label of the grasping object 301 is the same as the type label which was input to the learning unit 204 in S110. The orientation label of the grasping object 301 is one of the identification numbers of the orientation labels which were input to the learning unit 204 in S110.

In the example illustrated in FIG. 6, all of the type labels of the grasping objects 301 are "disk parts". It is recognized that the orientation label of the grasping object 301A is equal to 50, the orientation label of the grasping object 301B is equal to 170, and the orientation label of the grasping object 301C is equal to 300. With respect to the grasping objects 301, the type and orientation (state) are individually recognized.

(S104)

The recognizing unit 205 discriminates whether or not the grasping operation has been finished to all of the grasping objects 301. In this instance, when none of the grasping objects 301 is detected (that is, when the type label and orientation label are not output), it is determined that the process has been finished to all of the grasping objects 301. The processes of the flowchart of FIG. 5A are finished. If at least one of the grasping objects 301 was detected, the processing routine advances to S105.

(S105)

The grasping unit identifying unit 207 identifies the type of grasping unit 102 and transmits the grasping unit type label to the operation generating unit 206. Although the processes in S102 to S108 are repeatedly executed in the embodiment, with respect to the process of S105, so long as the type of grasping unit 102 is not changed, it is sufficient to execute the process only once. In other words, after the second time, the process of S105 may be omitted.

(S106)

The operation generating unit 206 compares the type label and orientation label of the grasping object 301 obtained in S103 and the grasping unit type label obtained in S105 with the grasping object type label 520, the grasping object state label 530, and the grasping unit type label 540 included in the grasping condition 500.

The operation generating unit 206 extracts the grasping condition element 510 in which the relevant type label coincides with the grasping object type label 520, the relevant grasping unit type label coincides with the grasping unit type label 540, and the relevant orientation label is included in the grasping object state label 530. If the orientation label included in any one of the grasping object state labels 530 does not exist, the operation generating unit 206 extracts the grasping condition element 510 corresponding to the blank grasping object state label 530.

When considering the grasping condition element in FIG. 4 and the grasping object in FIG. 6 as an example, if "suction cup" is identified in S105, the grasping condition element 510A is extracted to the grasping object 301A. The grasping condition element 510B is extracted to the grasping object 301B. The grasping condition element 510C is extracted to the grasping object 301C.

If "tweeze-type gripper" is identified in S105, the grasping condition element 510D is extracted to the grasping object 301A. The grasping condition element 510E is extracted to the grasping object 301B. The grasping condition element 510F is extracted to the grasping object 301C.

(S107)

The operation generating unit 206 decides the grasping operation which is executed by the grasping unit 102 from the plurality of grasping condition elements 510 extracted in S106. That is, on the basis of a result of the discrimination about whether or not the state of the grasping object satisfies the condition for executing the grasping operation in S106, the operation generating unit 206 generates the grasping operation which is executed by the grasping unit 102. The process for generating the grasping operation will be described hereinbelow.

First, the operation generating unit 206 further extracts the grasping condition element 510 added with the "grasp" label by referring to the grasping operation label 550 among the plurality of extracted grasping condition elements 510. In this instance, when "suction cup" is identified in S105, in the example of FIG. 4, the grasping condition elements 510A and 510B are extracted.

Subsequently, the operation generating unit 206 selects one grasping condition element of highest priority from the extracted grasping condition elements 510. In the example of FIG. 4, the grasping condition element 510A of highest priority is selected. Since there is no associating operation and the required time is short, the priority of the grasping condition element 510A is higher than that of the grasping condition element 510B.

Subsequently, the operation generating unit 206 generates the grasping operation and associating operation with reference to an operation destination table 600.

Figure 7A:
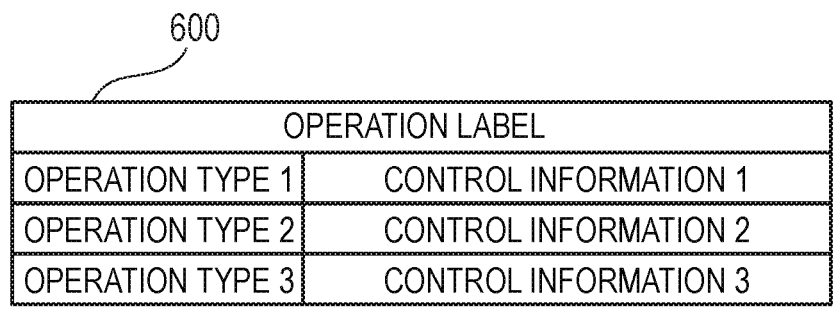
FIGS. 7A, 7B and 7C are diagrams illustrating operation definition tables.
Figure 7B:
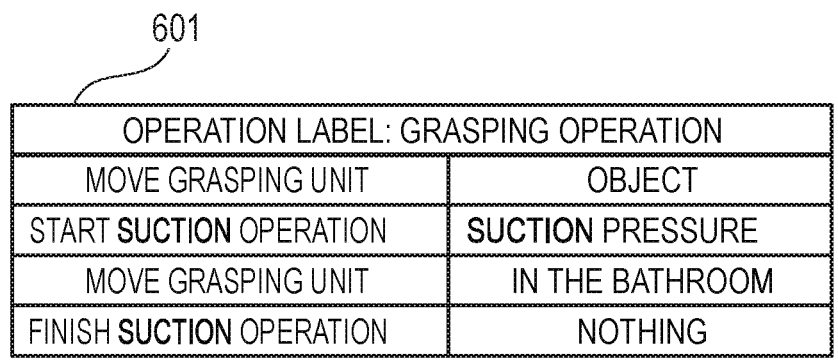
Figure 7C:
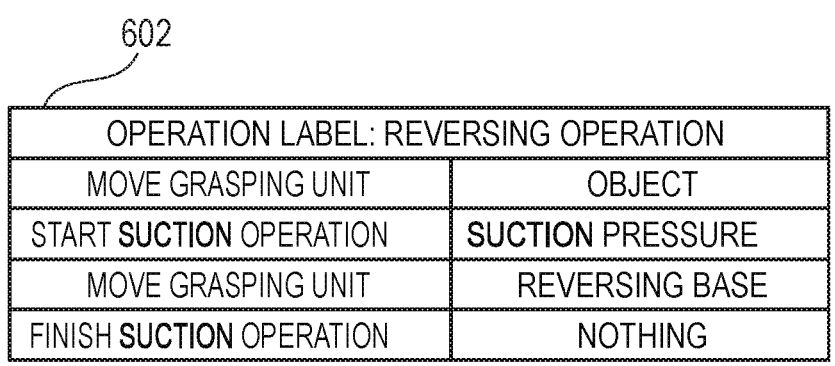

FIGS. 7A to 7C are diagrams illustrating examples of the operation definition table. As illustrated in FIG. 7A, the operation definition table 600 is constructed by a set of an operation label, a plurality of operation types, and a plurality of control information. FIG. 7B is a diagram illustrating an example of an operation definition table 601 regarding the grasping operation. The operation generating unit 206 writes values of the control parameters which were output by the recognizing unit 205 into a column of the control information "object" corresponding to the first operation type "move grasping unit" in the operation definition table 601 of FIG. 7B and a column of the control information "suction pressure" corresponding to the next operation type "start suction operation". Subsequently, the operation generating unit 206 writes values of a predetermined position orientation showing the inside of the bathroom into a column of the control information "in the bathroom" corresponding to the third operation type "move grasping unit". The operation generating unit 206 outputs the operation definition table 601 generated in this manner to the control unit 208.

If values have been set into the associating operation label 560 in the grasping condition element 510, the operation generating unit 206 further adds an operation definition table 602. If the operation of the associating operation label 560 indicates "reversing operation", the operation generating unit 206 writes necessary control information into the operation definition table 602 of "reversing operation" illustrated in FIG. 7C and outputs to the control unit 208. The operation definition table 601 corresponds to an example of information for allowing the grasping unit 102 to execute the grasping operation. The operation definition table 602 corresponds to an example of information for allowing the grasping unit 102 to execute the associating operation.

(S108)

The control unit 208 generates a control command for allowing the grasping unit 102 to execute the grasping operation from the operation definition table which was output from the operation generating unit 206 and outputs to the grasping unit 102. Specifically speaking, the control unit 208 reads out each operation from the operation definition tables 601 and 602 and decomposes into a command train for executing the operation contents.

With respect to "move grasping unit" in FIG. 7B, an orbit from the present position orientation of the grasping unit 102 to the position orientation of the grasping object 301 is generated, and a control command for moving the orbit to a defined position orientation is generated. With respect to "start suction operation", a control command for performing the suction by a designated suction pressure is generated. The control unit 208 transmits the generated control command to the grasping unit 102.

The grasping unit 102 executes the grasping operation on the basis of the received control command. After completion of the execution of a predetermined grasping operation (and associating operation), the grasping unit 102 transmits a control signal of the end of the command execution to the control unit 208. When the control unit 208 receives the control signal of the command execution end from the grasping unit 102, the grasping operation of one time is completed. The processing routine is returned to S102 and the processes are repeated until the grasping operations of all of the grasping objects 301 are completed.

According to the first embodiment, the captured image and depth image captured by the imaging unit 101 are input and the recognizing unit 205 detects the state of the grasping object 301 and, at the same time, outputs the control parameters for driving the grasping unit 102. The operation generating unit 206 generates an operation definition table as information for allowing the grasping unit 102 to execute the grasping operation on the basis of the state of the grasping object 301 and the grasping condition as a condition for executing the grasping operation. Therefore, by setting the condition for executing the grasping operation every state of the grasping object 301, the grasping operation can be executed in accordance with the state of the grasping object 301. On the other hand, such a mode that even if the object can be grasped, the grasping operation is not executed can be set in dependence on the state of the grasping object 301.

The operation generating unit 206 discriminates whether or not the state of the grasping object 301 satisfies the condition for executing the grasping operation. If a discrimination result is YES, the operation generating unit 206 generates information for allowing the grasping unit 102 to execute the grasping operation. Therefore, by setting the state of the grasping object 301 which is suitable to execute the grasping operation into the condition for executing the grasping operation, the grasping object 301 can be easily grasped.

The operation generating unit 206 discriminates whether or not the state of the grasping object 301 satisfies the condition for executing the grasping operation. If a discrimination result indicates YES, the operation generating unit 206 generates information for allowing the grasping unit 102 to execute the associating operation which is executed before and after the grasping operation. Therefore, the grasping unit 102 can be made to execute the operation associated with the grasping operation.

The recognizing unit 205 outputs the control parameter according to the state of the grasping object 301. The operation generating unit 206 decides the optimum grasping operation on the basis of the control parameter. Therefore, the contents of the grasping operation are switched according to the state of the grasping object and the optimum grasping operation can be executed.

In the embodiment, in S106, the operation generating unit 206 compares all of the type label of the grasping object, the orientation label of the grasping object, and the grasping unit type label. However, with respect to the type label of the grasping object and the grasping unit type label among them, the comparison of a part of them may be omitted. For example, the grasping object state label 530 which is common to a plurality of grasping object types or grasping units may be used.

As for the priority 570, not only the priority is directly designated but also indirect information or value for deciding the priority such as a grasping success rate or the like in the embodiment may be used. The priority 570 is not limited to the grasping success rate but may be another scale which can compare superiority or inferiority of the grasping such as a time which is required for the grasping or the like, or a plurality of such elements may be combined and used.

Although the embodiment has been described on the assumption that labels for distinguishing three kinds of orientations are allocated as a grasping object state label 530, the classification number of orientations can be set to an arbitrary value. It is sufficient that the classification number of the grasping object state label 530 is set to a value enough to distinguish each condition of the grasping condition element 510.

Although the associating operation label 560 defines the operation associated with the grasping operation in the embodiment, the associating operation may be executed before or after the grasping operation. As an example of the associating operation before the grasping operation, an operation for changing the position of the grasping object 301 (for example, breaking a mountain) can be mentioned. Therefore, the success rate of the grasping operation which is generated by the operation generating unit 206 can be raised. As an example of the associating operation after the grasping operation, the foregoing reversing operation for changing the orientation of the grasping unit 102 can be mentioned.

[Modification 1]

Although the embodiment has been described with respect to such a construction that the learning unit 204 and the recognizing unit 205 execute the learning and recognition by CNN, the learning and recognition may be executed by other units. The learning unit 204 and the recognizing unit 205 can be also constructed so as to use various kinds of methods such as support vector machine, random forest, template matching, and the like.

[Modification 2]

The input factors of the learning unit 204 and the recognizing unit 205 are not limited to the captured image and depth image but other various kinds of factors may be used. For example, not only a sensor for imaging the captured image but also a sensor which can measure a temperature is separately provided for the imaging unit 101 and the temperature may be added to the condition of the grasping object state label 530. In this case, the operation generating unit 206 can control the contents of the grasping operation in accordance with the temperature of the grasping object 301.

[Modification 3]

The grasping object state label 530 is not limited to the orientation of the grasping object 301. As described in Modification 2, sensors for measuring specific states of the grasping object 301 are separately provided and various kinds of states such as differences of specific colors, patterns, and shapes, whether or not a material is contained, and the like can be set into the grasping object state label 530. A combination of a plurality of states such as orientation, color, and the like may be set into the grasping object state label 530.

[Modification 4]

The learning unit 204 is not limited to such a construction that the learning is performed as a preparation in S100. It is also possible to construct in such a manner that after an initial value of the recognition data was generated in S100, at a point of time when the recognizing process in S103 is executed, the input data is also supplied to the learning unit 204 and the recognition data is updated by an additional learning.

[Modification 5]

It is also possible to construct in such a manner that a grasping intensity label 580 (not shown) showing intensity of the grasping operation is added to the grasping condition element 510 of the grasping condition 500, thereby enabling the intensity of the grasping to be changed in accordance with the value of the grasping object state label 530. In this Modification, three kinds of values showing "high", "middle", and "low" are described in the grasping intensity label 580. When the operation generating unit 206 generates the grasping operation in S107, it refers to the grasping intensity label 580 contained in the extracted grasping condition element 510. The operation generating unit 206 generates the grasping operation by multiplying the control parameter (suction pressure in the case where the grasping unit is the suction) regarding the grasping which was output from the recognizing unit 205 by a predetermined coefficient according to the value of the grasping intensity label 580. The predetermined coefficient is set to a value larger than 1 when the grasping intensity label 580 is "high", is set to 1 when it is "middle", and is set to a value larger than 0 and less than 1 when it is "low". Thus, in such an unstable orientation that the grasping object 301 is liable to drop during the conveyance after it was grasped, by enhancing the grasping intensity, a certainty of conveyance is raised.

Second Embodiment

In the second embodiment, an apparatus which can be applied to a case where, from objects such as a plurality of parts or the like disposed at arbitrary position orientations, the contents of the grasping operation are determined in accordance with a state of the object and the grasping is performed by using a grasping unit attached to a robot arm or the like will be described.

In the present embodiment, the captured image and depth image captured by the imaging unit are input and the recognizing unit detects at least one of the orientations of the grasping object. A grasping parameter setting unit sets the position orientation, grasping intensity, and the like, as parameters, for allowing the grasping unit to grasp the grasping object in accordance with the type of grasping object and the type of grasping unit. The operation generating unit compares the detected orientation with the previously defined grasping condition and determines the optimum grasping operation with reference to the parameters. The grasping unit executes the determined grasping operation. Thus, the contents of the grasping operation are switched in accordance with the orientation of the grasping object and the optimum grasping operation can be executed.

Figure 8:
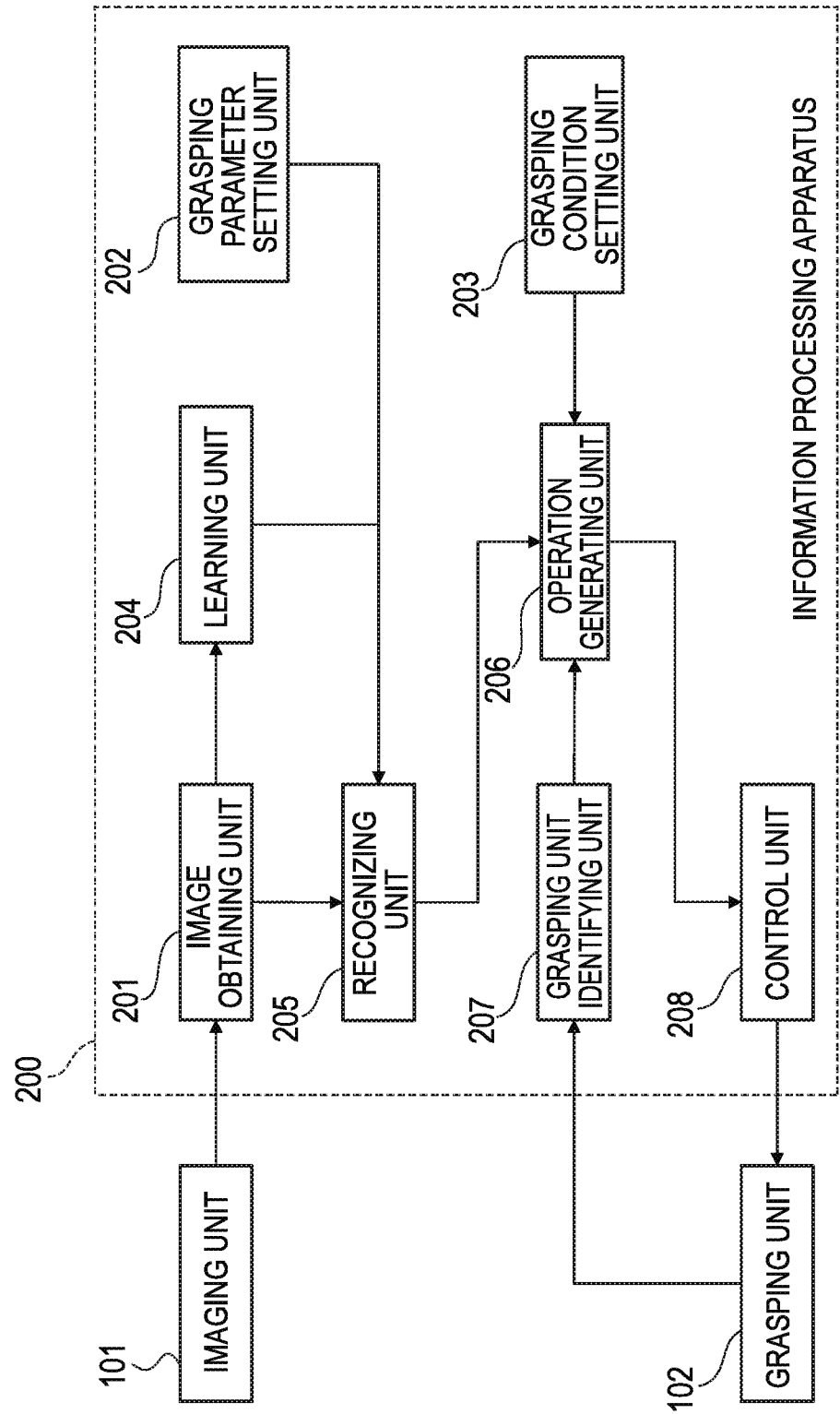
FIG. 8 is a diagram illustrating a whole construction of a grasping system of the second embodiment.

FIG. 8 is a diagram illustrating an example of a whole construction of a grasping system according to the second embodiment.

When comparing with the whole construction of the grasping system of the first embodiment illustrated in FIG. 1, in the grasping system of the present embodiment, a grasping parameter setting unit 202 is added. A difference from the first embodiment will be described hereinbelow and a description about substantially the same portions is properly omitted.

The grasping parameter setting unit 202 sets a group of parameters, as a grasping parameter 400, which are necessary to allow the grasping unit 102 to grasp the grasping object 301. In this instance, the parameter corresponds to an example of the grasping information.

Figure 9A:
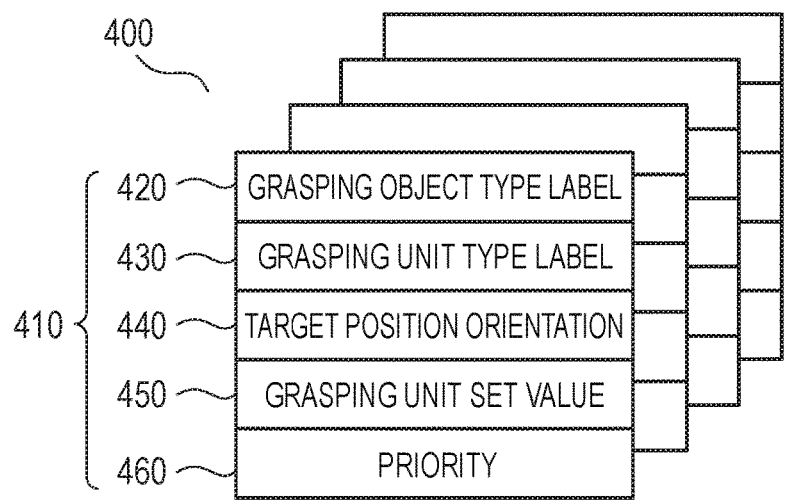
FIGS. 9A, 9B, 9C, 9D and 9E are diagrams for describing grasping parameters.

FIG. 9A is a diagram for describing an example of a data structure of the grasping parameter 400. The grasping parameter 400 is constructed by a set of one or more grasping parameter elements 410. Each grasping parameter element 410 is constructed by a grasping object type label 420, a grasping unit type label 430, a target position orientation 440, a grasping unit set value 450, and a priority 460.

The grasping object type label 420 is a label for uniformly identifying the type of grasping object 301. The type of grasping object 301 is a unit of a group of grasping objects of the same shape or same external appearance. So long as industrial parts, the type of grasping object 301 is the same as the type of parts. Specifically speaking, the type of grasping object 301 is such a minimum unit that the same parameter group can be used when the grasping unit 102 grasps the grasping object 301. That is, information which is necessary for the grasping unit 102 to grasp the grasping object 301 differs every type of grasping object 301. Therefore, the grasping object type label 420 is used to distinguish the type of grasping object 301.

The grasping unit type label 430 is a label for uniformly identifying the type of grasping unit 102. In the embodiment, a label for identifying "suction cup" or "tweeze-type gripper" is set into the grasping unit type label 430. With respect to the grasping unit type label 430, even if the grasping object type label 420 is the same, when the type of grasping unit 102 differs, the parameter for allowing the grasping unit 102 to grasp also differs. Therefore, the grasping unit type label 430 is used to distinguish the type of grasping unit 102.

The target position orientation 440 shows the position orientation serving as a destination where the robot arm 302 moves the grasping unit 102 in order to allow the grasping unit 102 to grasp the grasping object 301.

FIGS. 9B to 9E are diagrams for describing examples of the target position orientation 440.

Figure 9B:
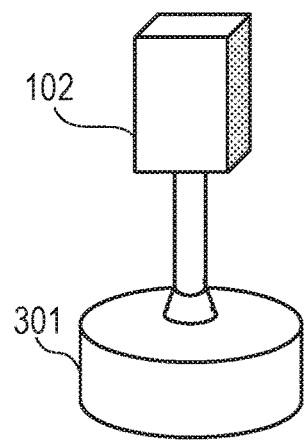
Figure 9C:
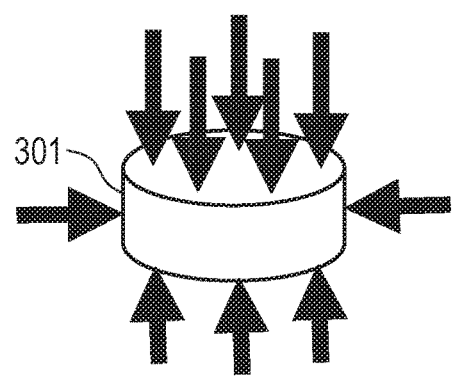

FIGS. 9B and 9C illustrate an example in which the grasping object 301 is grasped by the grasping unit 102 in the case where the grasping unit type label in the grasping parameter element 410 is "suction cup". As illustrated in FIG. 9B, the grasping unit 102 can grasp one point on the front surface of the grasping object 301. The grasping unit 102 can suction not only one point on the front surface of the grasping object 301 but also a plurality of positions including the side surface and the back surface. That is, by moving the grasping unit 102 to the positions shown by front edges of arrows and the orientations shown by the directions of the arrows in FIG. 9C and performing the suction, the grasping object 301 can be grasped.

Figure 9D:
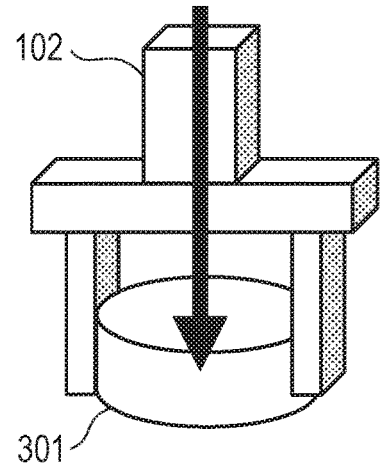
Figure 9E:
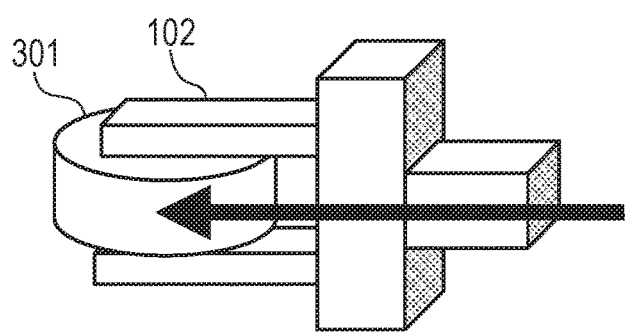

FIGS. 9D and 9E illustrate an example in which the grasping object 301 is grasped by the grasping unit 102 in the case where the grasping unit type label in the grasping parameter element 410 is "tweeze-type gripper". Also in this case, the grasping object 301 can be grasped at a plurality of position orientations in a manner similar to the case of the suction cup.

In the type of grasping object 301 and the type of grasping unit 102, if a plurality of target position orientations can be set, a plurality of grasping parameter elements 410 are set every different position orientation. In the embodiment, the target position orientation 440 is described by six degrees of freedom showing three-dimensional position and orientation in a coordinate system of the grasping object 301.

The grasping unit set value 450 shows a parameter which is necessary for allowing the grasping unit 102 to grasp the grasping object 301 at the target position orientation 440. The contents of the grasping unit set value 450 differ in dependence on the contents of the grasping unit type label 430. In the embodiment, if the grasping unit type label indicates "suction cup", a flow rate or pressure is described in the grasping unit set value 450. If the grasping unit type label indicates "tweeze-type gripper", a pressure and an opening width of the pincette at the time when the grasping object 301 is grasped by the pincette are described.

The priority 460 designates the priority at which the grasping unit 102 grasps among the plurality of grasping parameter elements 410. In the embodiment, the priority 460 is set on the basis of a grasping success rate in the grasping parameter element 410. That is, the higher the grasping success rate in the grasping parameter element 410 is, the priority 460 is set to a high order.

Different from the first embodiment, the priority 570 is not set into the grasping condition 500 in the embodiment.

As for the grasping object state label 530 in the embodiment, the available orientation in the three-dimensional space of the grasping object 301 is classified into 360 orientations and numbers 1 to 360 corresponding to the orientations are set into the grasping object state label 530.

The grasping object state label 530 can take a plurality of values. By considering a case of controlling the processes to the three states of the front surface, back surface, and side surface with respect to the grasping object 301 in the embodiment, all of the orientations labels about such orientations that it can be regarded that the grasping object 301 is in the state of "front surface" are described in the grasping object state label 530.

Figure 10A:
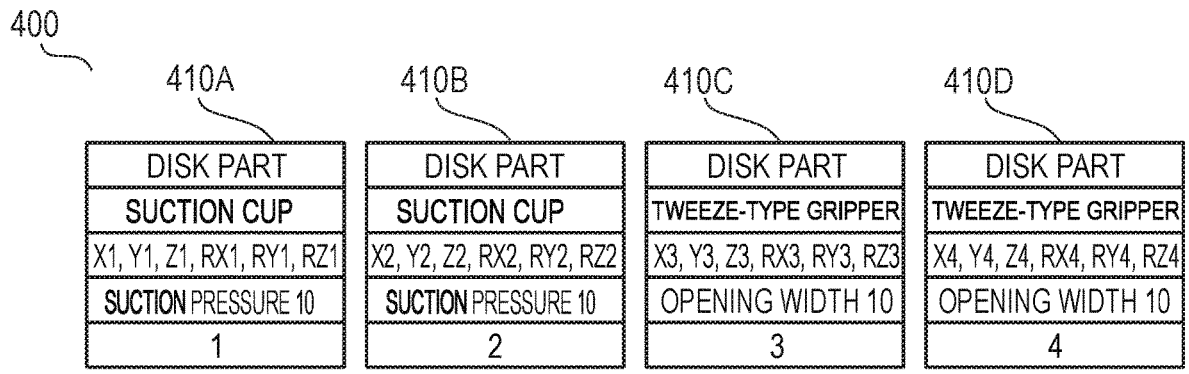
FIGS. 10A and 10B are diagrams illustrating specific examples of the grasping parameters and the grasping conditions.
Figure 10B:
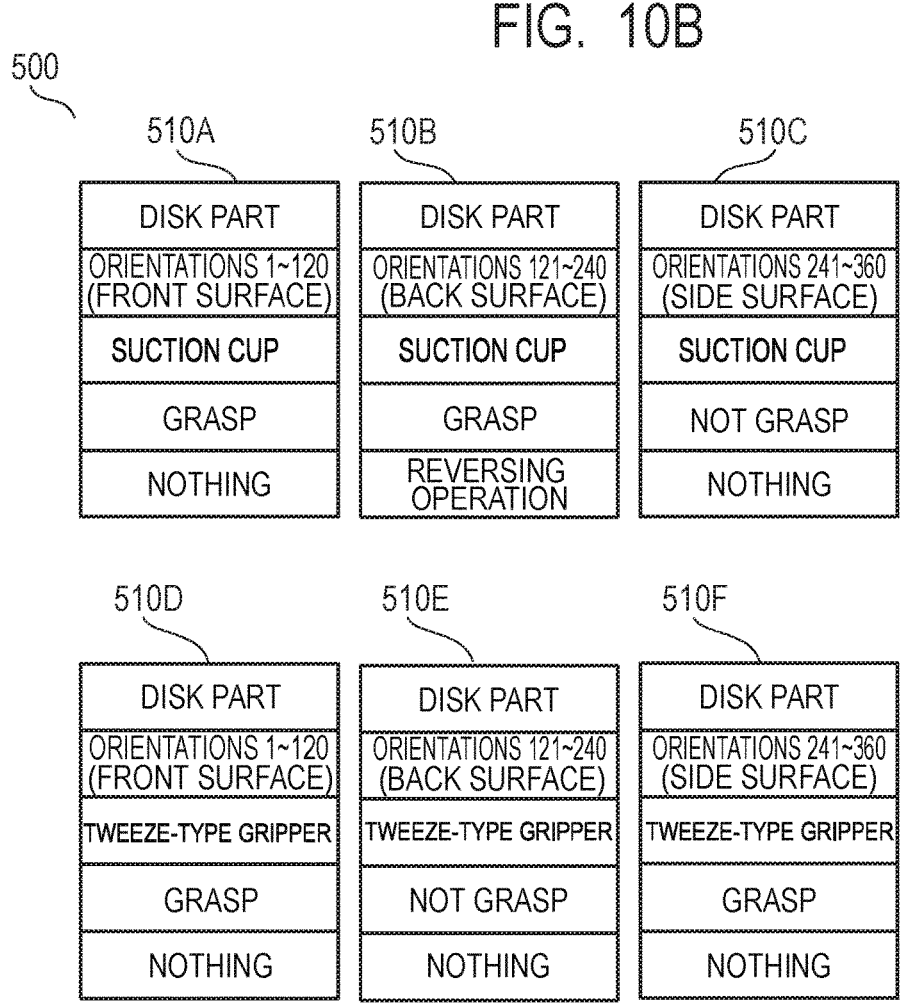

FIGS. 10A and 10B are diagrams illustrating specific examples of the grasping parameter 400 and the grasping condition 500.

In this instance, examples of a plurality of grasping parameter elements 410A to 410D and examples of a plurality of grasping condition elements 510A to 510F are shown. Values of FIGS. 10A and 10B will be described as examples hereinbelow.

Returning to FIG. 8, a functional construction of the information processing apparatus 200 will be further described.

The learning unit 204 generates recognition data which is used by the recognizing unit 205. Specifically speaking, when the captured image and depth image are input to the recognizing unit 205, the learning unit 204 generates the recognition data for allowing the recognizing unit 205 to output the optimum grasping object type label and grasping object state label. In the embodiment, the learning and recognition are performed by CNN. The recognition data in the embodiment is constructed by the model structure of CNN and the weight parameter of each node. In the embodiment, different from the first embodiment, the control parameter of the grasping unit 102 is not contained in the recognition data.

The recognizing unit 205 executes the recognizing process by CNN on the basis of the recognition data to the captured image and depth image which were input, and outputs the optimum grasping object state label. The recognizing unit 205 outputs the grasping parameter 400 from the grasping parameter setting unit 202.

The operation generating unit 206 generates the grasping operation of the grasping unit 102 from the grasping parameter 400 and the grasping object state label which were output by the recognizing unit 205.

Subsequently, control of the information processing apparatus 200 in the embodiment will be described with reference to the flowchart of FIG. 5A. The flowchart of FIG. 5A is substantially the same as that in the first embodiment. However, since there is a difference between the contents of the process in each step, it will be described hereinbelow.

(S100)

The learning unit 204 performs a preparation. Specifically speaking, the learning unit 204 preliminarily makes a plurality of captured images and a plurality of depth images correspond to the orientations of the grasping object 301. When other captured image and depth image are input, the learning unit 204 generates such recognition data that the proper orientation of the grasping object 301 is output. When the recognition data was generated once, even in the case of repeatedly executing the processes in the embodiment after that, the process of S100 can be omitted.

Subsequently, the preparation process of S100 will be described with reference to the flowchart of FIG. 5B.

(S110)

The learning unit 204 reads out learning data from the storage device. The user previously makes the learning data by using the input device or display device (not shown).

The learning data in the embodiment is constructed by a set of combinations of the captured image and depth image and the type label and orientation label of the grasping object 301 which can be grasped among the grasping objects 301 displayed in the captured image. The type label of the grasping object 301 in the embodiment is a label for uniformly identifying the type of grasping object 301 and it available values are the same as those of the grasping object type label 420. The orientation label in the embodiment is an identification number at the time when the available orientation in the three-dimensional space of the grasping object 301 is classified into 360 orientations. Since the orientation label is compared with the grasping object state label 530, their available values are the same.

(S111)

The learning unit 204 performs the learning of CNN on the basis of the read learning data and generates the recognition data. In the embodiment, different from the first embodiment, the learning unit 204 does not perform the grasping learning.

Returning to the flowchart of FIG. 5A, the processes in S101 and subsequent steps will be described.

(S101)

The grasping parameter setting unit 202 reads out the grasping parameter 400 from the storage device. The grasping condition setting unit 203 reads out the grasping condition 500. The learning unit 204 reads the recognition data generated in S100 and sets the model structure of CNN and the weight parameter of each node.

(S103)

The recognizing unit 205 obtains the captured image and depth image from the image obtaining unit 201. The recognizing unit 205 applies CNN to the captured image and depth image and outputs the type label and orientation label of the grasping object 301 corresponding to the captured image and depth image. The type label of the grasping object 301 is the same as the type label which was input to the learning unit 204 in S110. The orientation label of the grasping object 301 is one of the identification numbers of the orientation labels which were input to the learning unit 204 in S110.

In the example illustrated in FIG. 6, all of the type labels of the grasping objects 301 are recognized as "disk part", the orientation label of the grasping object 301A is recognized as 50, the orientation label of the grasping object 301B is recognized as 170, and the orientation label of the grasping object 301C is recognized as 300.

(S106)

The operation generating unit 206 compares the type label and orientation label of the grasping object 301 obtained in S103 and the grasping unit type label obtained in S105 with the grasping object type label 520, grasping object state label 530, and grasping unit type label 540 contained in the grasping condition 500.

The operation generating unit 206 extracts the grasping condition element 510 in which the relevant type label and the grasping object type label 520 coincide, the relevant grasping unit type label and the grasping unit type label 540 coincide, and the relevant orientation label is included in the grasping object state label 530. If the orientation label included in any one of the grasping object state labels 530 does not exist, the operation generating unit 206 extracts the grasping condition element 510 corresponding to the blank grasping object state label 530.

When considering the grasping condition elements in FIG. 10B as an example, if "suction cup" has been identified in S105, the grasping condition element 510A is extracted for the grasping object 301A. The grasping condition element 510B is extracted for the grasping object 301B. The grasping condition element 510C is extracted for the grasping object 301C.

If "tweeze-type gripper" has been identified in S105, the grasping condition element 510D is extracted for the grasping object 301A. The grasping condition element 510E is extracted for the grasping object 301B. The grasping condition element 510F is extracted for the grasping object 301C.

(S107)

The operation generating unit 206 generates the grasping operation which is executed by the grasping unit 102 from the plurality of grasping condition elements 510 extracted in S106. The process for generating the grasping operation will be described hereinbelow.

First, the operation generating unit 206 further extracts the grasping condition element 510 added with the "grasp" label by referring to the grasping operation label 550 among the plurality of extracted grasping condition elements 510. If "suction cup" has been identified in S105, the grasping condition elements 510A and 510B are extracted in the example of FIG. 10B.

Subsequently, by referring to the grasping parameter 400, the operation generating unit 206 compares the grasping object type label 520 in the extracted grasping condition element 510 with the grasping object type label 420 and compares the grasping unit type label 540 with the grasping unit type label 430. The operation generating unit 206 extracts a plurality of grasping parameter elements 410 in which both of those labels coincide. The operation generating unit 206 selects one grasping parameter element having the highest priority from the plurality of extracted grasping parameter elements 410 by referring to the priority 460. In the example of FIG. 10A, the grasping parameter elements 410A and 410B are extracted and the grasping parameter element 410A having the high priority is further selected.

Subsequently, the operation generating unit 206 calculates a position orientation in the three-dimensional space of the grasping object 301 by using the orientation label and depth image of the grasping object 301. With respect to the position, it is calculated from coordinates in the captured image at which the grasping object 301 was measured and the value of the depth image corresponding to the coordinates. With respect to the orientation, the orientation corresponding to the orientation label of the grasping object 301 is obtained from a lookup table (not shown). The operation generating unit 206 converts the value of the target position orientation 440 contained in the selected grasping parameter element 410 by using the calculated position orientation. Specifically speaking, since the position orientation described in the target position orientation 440 is a position orientation in the coordinate system of the grasping object 301, it is converted into the position orientation in the coordinate system of the imaging unit 101. In the example of FIG. 10A, the target position orientation 440 (that is, X1, Y1, Z1, RX1, RY1, RZ1) in the grasping parameter element 410A is converted into the position orientation in the coordinate system of the imaging unit 101.

The operation generating unit 206 generates the grasping operation and the associating operation with reference to the operation definition table 600. The operation generating unit 206 writes the converted position orientation into the column of the control information "object" corresponding to the first operation type "move grasping unit" in the operation definition table 601 of FIG. 7B. Subsequently, the operation generating unit 206 writes the value of the grasping unit set value 450 in the selected grasping parameter element 410 into the column of the control information "suction pressure" corresponding to the second operation type "start suction operation". Subsequently, the operation generating unit 206 writes the value of the predetermined position orientation showing the inside of the tray into the column of the control information "in the bathroom" corresponding to the third operation type "move grasping unit". The operation generating unit 206 outputs the operation definition table 601 generated in this manner to the control unit 208.

If a value has been set in the associating operation label 560 in the grasping condition element 510, the operation generating unit 206 further adds the operation definition table 602. If the operation of the associating operation label 560 indicates "reversing operation", the operation generating unit 206 writes the necessary control information into the operation definition table 602 of "reversing operation" illustrated in FIG. 7C and outputs to the control unit 208.

According to the second embodiment, the captured image and depth image captured by the imaging unit 101 are input and the recognizing unit 205 detects at least one of the orientations of the grasping object 301. The grasping parameter setting unit 202 sets the position orientation, grasping intensity, and the like, as parameters, for allowing the grasping unit 102 to grasp the grasping object 301 in accordance with the type of grasping object 301 and the type of grasping unit 102. The operation generating unit 206 generates the operation definition table for allowing the grasping unit 102 to execute the grasping operation on the basis of the parameters. Therefore, by setting the parameter every type of grasping object or every type of grasping unit 102, the grasping object can be easily grasped.

In the embodiment, it is not always necessary that the target position orientation 440 is the position orientation of six degrees of freedom. So long as the position orientation enough for the grasping unit 102 to grasp the grasping object 301 can be set, a position orientation of a dimension lower than two degrees of freedom, three degrees of freedom, or the like may be used. An angle or the like of each joint constructing the grasping unit 102 or the robot arm 302 may be used instead of the position orientation of the grasping unit 102.

The target position orientation 440 is not limited to the single position orientation. For example, it may be designated as an available range of the parameter of each dimension such as $1 \leq X \leq 2$ or the like.

As for the priority 460, not only the priority is directly designated but also indirect information or value for deciding the priority such as a grasping success rate or the like in the embodiment may be used. The priority 460 is not limited to the grasping success rate but may be another scale which can compare superiority or inferiority of the grasping such as a time which is required for the grasping or the like, or a plurality of such elements may be combined and used.

[Modification 6]

In the grasping system, a three-dimensional measuring apparatus may be separately provided in or out of the imaging unit 101. The three-dimensional measuring apparatus obtains a group of three-dimensional points in place of the depth image of the scene including the grasping object 301. In this case, in place of the depth image, the three-dimensional point group is input to the learning unit 204 and the recognizing unit 205.

Third Embodiment

In the third embodiment, an apparatus which can be applied to a case where, from objects such as a plurality of parts or the like disposed at arbitrary position orientations, a unit and the contents of the grasping operation are determined in accordance with a state of the object and the grasping is performed by using a grasping unit attached to a robot arm or the like will be described.

In the present embodiment, the captured image and depth image captured by the imaging unit are input and the recognizing unit detects at least one of the orientations of the grasping object. The grasping parameter setting unit sets the position orientation, grasping intensity, and the like, as parameters, for allowing the grasping unit to grasp the grasping object in accordance with the type of grasping object and the type of grasping unit. The operation generating unit compares the detected orientation with the previously defined grasping condition and determines the optimum grasping unit and grasping operation with reference to the parameters. A grasping unit changing unit changes the grasping unit provided for the grasping unit and the grasping unit executes the determined grasping operation. Thus, the grasping unit and the contents of the grasping operation are switched in accordance with the orientation of the grasping object and the optimum grasping operation can be executed.

Figure 11:
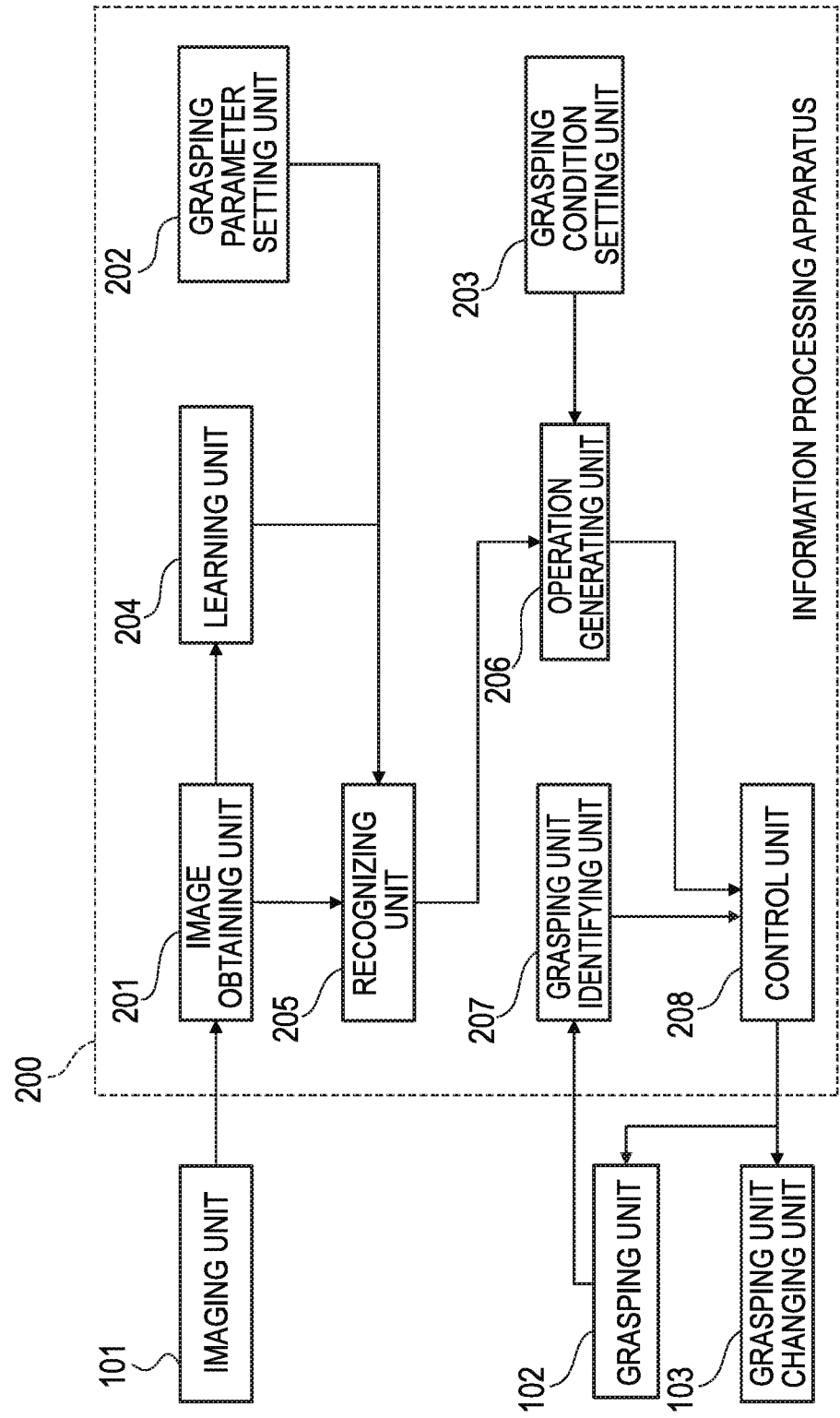
FIG. 11 is a diagram illustrating a whole construction of a grasping system of the third embodiment.

FIG. 11 is a diagram illustrating an example of a whole construction of a grasping system according to the third embodiment.

In the grasping system of the embodiment, a grasping unit changing unit 103 is added as compared with the whole construction of the grasping system of the second embodiment illustrated in FIG. 8. A difference from the second embodiment will be described hereinbelow and a description about the same portions is properly omitted.

The grasping unit changing unit 103 has a mechanism for changing the grasping unit of the grasping unit 102. For example, a tool changer or the like can be used as a grasping unit changing unit 103. In the embodiment, the grasping unit of the grasping unit 102 is changed to "suction cup" or "tweeze-type gripper" on the basis of a command from the control unit 208.

Subsequently, control of the information processing apparatus 200 in the embodiment will be described with reference to the flowchart of FIG. 5A. The flowchart of FIG. 5A is substantially the same as that in the second embodiment. However, since there is a difference of the contents of the process in each step, it will be described hereinbelow.

(S105)

The grasping unit identifying unit 207 identifies the type of grasping unit 102 and outputs the grasping unit type label to the control unit 208.

(S106)

The operation generating unit 206 compares the type label and orientation label of the grasping object 301 obtained in S103 with the grasping object type label 520 and the grasping object state label 530 included in the grasping condition 500.

The operation generating unit 206 extracts the grasping condition element 510 in which the relevant type label and the grasping object type label 520 coincide and the relevant orientation label is included in the grasping object state label 530. If the orientation label included in any one of the grasping object state labels 530 does not exist, the operation generating unit 206 extracts the grasping condition element 510 corresponding to the blank grasping object state label 530.

(S107)

The operation generating unit 206 generates the grasping operation which is executed by the grasping unit 102 from the plurality of grasping condition elements 510 extracted in S106. The process for generating the grasping operation will be described hereinbelow.

First, the operation generating unit 206 further extracts the grasping condition element 510 added with the "grasp" label by referring to the grasping operation labels 550 in the plurality of extracted grasping condition elements 510. In the example of FIG. 10B, the grasping condition elements 510A, 510B, 510D, and 510F are extracted.

Subsequently, the operation generating unit 206 compares the grasping object type label 520 in the extracted grasping condition element 510 with the grasping object type label 420 and compares the grasping unit type label 540 with the grasping unit type label 430 with reference to the grasping parameter 400. The operation generating unit 206 extracts a plurality of grasping parameter elements 410 in which both of them coincide. The operation generating unit 206 selects one grasping parameter element having the highest priority from the plurality of extracted grasping parameter elements 410 with reference to the priority 460. In the example of FIG. 10A, the grasping parameter elements 410A, 410B, 410C, and 410D are extracted and the grasping parameter element 410A of the high priority is further selected.

Subsequently, the operation generating unit 206 calculates a position orientation in the three-dimensional space of the grasping object 301 by using the orientation label and depth image of the grasping object 301. With respect to the position, it is calculated from coordinates in the captured image at which the grasping object 301 was measured and the value of the depth image corresponding to the coordinates. With respect to the orientation, the orientation corresponding to the orientation label of the grasping object 301 is obtained from a lookup table (not shown). The operation generating unit 206 converts the value of the target position orientation 440 contained in the selected grasping parameter element 410 by using the calculated position orientation. Specifically speaking, since the position orientation described in the target position orientation 440 is a position orientation in the coordinate system of the grasping object 301, it is converted into the position orientation in the coordinate system of the imaging unit 101. In the example of FIG. 10A, the target position orientation 440 (that is, X1, Y1, Z1, RX1, RY1, RZ1) in the grasping parameter element 410A is converted into the position orientation in the coordinate system of the imaging unit 101.

The operation generating unit 206 generates the grasping operation and the associating operation with reference to the operation definition table 600. The operation generating unit 206 writes the converted position orientation into the column of the control information "object" corresponding to the first operation type "move grasping unit" in the operation definition table 601 of FIG. 7B. Subsequently, the operation generating unit 206 writes the value of the grasping unit set value 450 in the selected grasping parameter element 410 into the column of the control information "suction pressure" corresponding to the second operation type "start suction operation". Subsequently, the operation generating unit 206 writes the value of the predetermined position orientation showing the inside of the bathroom into the column of the control information "in the bathroom" corresponding to the third operation type "move grasping unit". The operation generating unit 206 outputs the operation definition table 601 generated in this manner and the value of the grasping unit type label 430 corresponding to the selected grasping parameter element 410 to the control unit 208. In the examples of FIGS. 10A and 10B, the information of "suction cup" is output as a grasping unit type label to the control unit 208.

If a value has been set in the associating operation label 560 in the grasping condition element 510, the operation generating unit 206 further adds the operation definition table 602. If the operation of the associating operation label 560 indicates "reversing operation", the operation generating unit 206 writes the necessary control information into the operation definition table 602 of "reversing operation" shown in FIG. 7C and outputs to the control unit 208.

(S108)

Subsequently, the control unit 208 compares the grasping unit type label which was output from the operation generating unit 206 in S107 with the grasping unit type label which was output from the grasping unit identifying unit 207 in S105. If they differ, to the grasping unit changing unit 103, the control unit 208 generates a control command for changing the grasping unit to the grasping unit of the grasping unit type label which was output from the operation generating unit 206. The control unit 208 transmits the control command to the grasping unit changing unit 103, so that the grasping unit changing unit 103 changes the grasping unit of the grasping unit 102 on the basis of the control command.

According to the third embodiment, the captured image and depth image captured by the imaging unit 101 are input and the recognizing unit 205 detects at least one of the orientations of the grasping object. The grasping parameter setting unit 202 sets the grasping parameter 400 as information in which the type of holding unit and the priority were made to correspond. The operation generating unit 206 outputs the information of the type of grasping unit of high priority to the control unit 208 with reference to the grasping parameter 400. The control unit 208 changes the grasping unit of the grasping unit 102 by the grasping unit changing unit 103 on the basis of the information of the type of grasping unit. Thus, since the grasping unit of the grasping unit 102 can be switched, the optimum grasping operation can be executed.

[Modification 7]

If the grasping unit 102 can simultaneously use a plurality of grasping units, the grasping unit changing unit 103 can be omitted. For example, a case where the grasping unit 102 has the functions of both of the suction cup and the tweeze-type gripper and they can be simultaneously used is presumed. In this case, in place of generating the control command to the grasping unit changing unit 103, the control unit 208 directly transmits a control command for specifying which one of the grasping units is used to the grasping unit 102.

Fourth Embodiment

In the fourth embodiment, an apparatus which can be applied to a case where, from objects such as a plurality of parts or the like disposed at arbitrary position orientations, a unit and the contents of the grasping operation are determined in accordance with a state of the object and the grasping is performed by using a grasping unit attached to a robot arm or the like will be described.

In the present embodiment, the position orientation, grasping intensity, and the like for allowing the grasping unit to grasp the grasping object are registered as parameters in a step in which the learning unit performs the grasping learning. The captured image and depth image captured by the imaging unit are input and the recognizing unit detects at least one orientation of the grasping object. The operation generating unit compares the detected orientation with the previously defined grasping condition, and determines the optimum grasping unit and grasping operation by referring to the parameters. The grasping unit executes the determined grasping operation. Thus, even if the user does not input any parameter, the grasping unit and the contents of the grasping operation are switched in accordance with the orientation of the grasping object and the optimum grasping operation can be executed.

Figure 12:
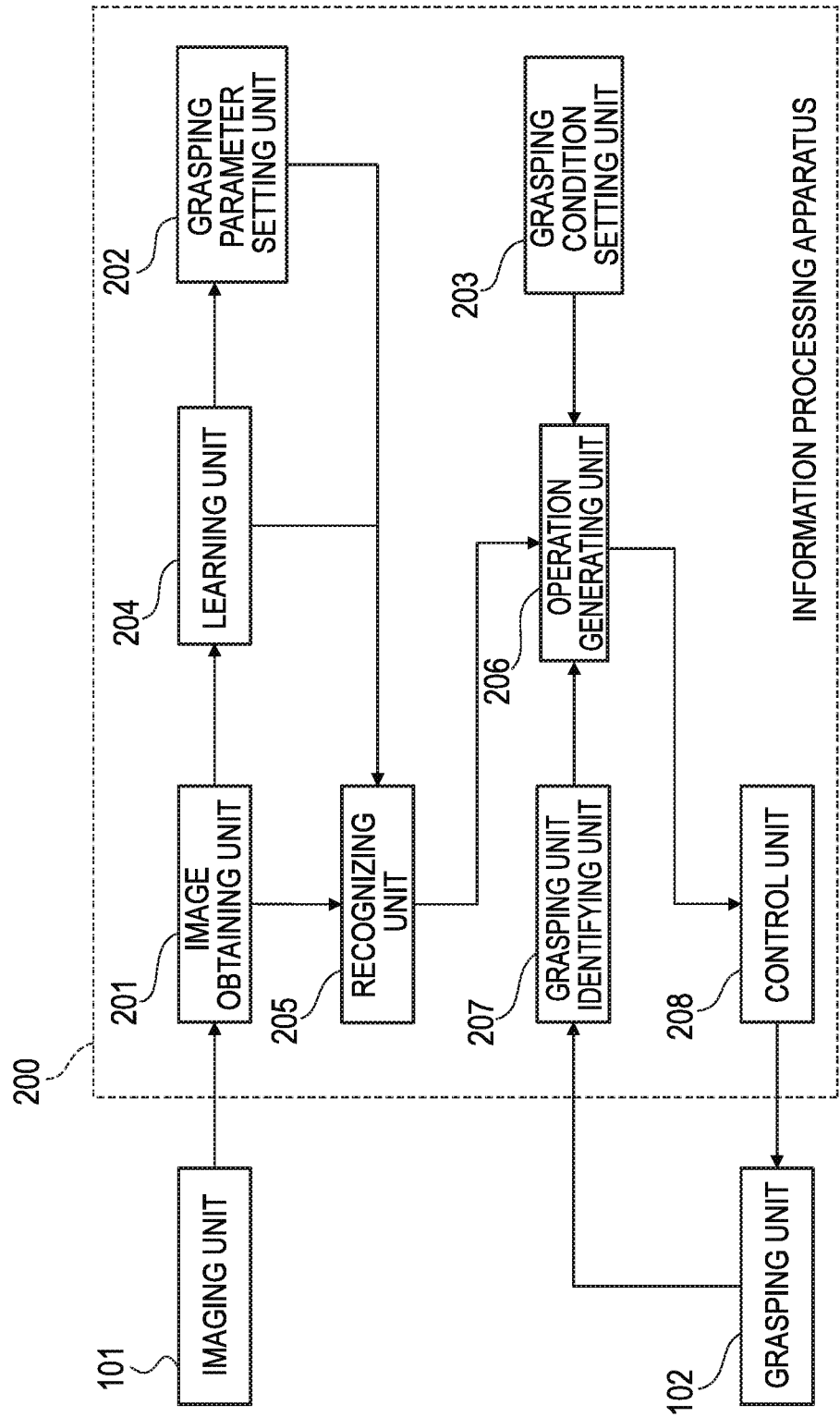
FIG. 12 is a diagram illustrating a whole construction of a grasping system of the fourth embodiment.

FIG. 12 is a diagram illustrating an example of a whole construction of a grasping system of the fourth embodiment.

In the grasping system of the embodiment, when comparing the whole construction of the grasping system of the second embodiment illustrated in FIG. 8, an arrow from the learning unit 204 to the grasping parameter setting unit 202 is added. A difference from the second embodiment will be described hereinbelow and a description about the same portions is properly omitted.

The grasping parameter setting unit 202 sets a group of parameters, as a grasping parameter 400, necessary for allowing the grasping unit 102 to grasp the grasping object 301.

The learning unit 204 generates recognition data which is used by the recognizing unit 205. Different from the second embodiment, the learning unit 204 in the embodiment further generates the grasping parameter 400.

Subsequently, control of the information processing apparatus 200 in the embodiment will be described with reference to the flowchart of FIG. 5B. The flowchart of FIG. 5B is substantially the same as that in the second embodiment. However, since there is a difference of the contents of the process in each step, it will be described hereinbelow.

(S111)

The learning unit 204 performs the learning of CNN. The learning unit 204 generates the grasping parameter 400. A specific process will be described hereinbelow.

First, the learning unit 204 performs the learning of CNN by two stages in a manner similar to the first embodiment.

In the first learning, to the captured image and depth image, the learning unit 204 generates recognition data for identifying the type label and orientation label of the grasping object 301 on the basis of the learning data which was read in S110.

In the next learning, to the captured image and depth image, without using the learning data which was read in S110, the learning unit 204 generates recognition data for outputting the control parameter of the grasping unit 102. A method called grasping learning can be applied to this learning. As for the grasping learning, the actual grasping is performed by the grasping unit 102 to the captured image and depth image which were input and the learning is performed on the basis of its result. When the grasping is successful, the learning is performed so as to output the control parameter at the time of the recognition. When the sufficient learning is performed, by inputting the captured image and depth image to the recognizing unit 205, an area where it is determined that the success rate of the grasping is high in the captured image and the control parameter for grasping the grasping object 301 at that time are output.

In the step of performing the grasping learning, to the captured image and depth image which were input, the learning unit 204 records the position orientation at the time when the grasping has actually been performed (hereinbelow, called grasping position orientation). When the grasping is successful, recognizing unit 205 recognizes the type label and orientation label of the grasping object 301 to the captured image and depth image. Subsequently, the learning unit 204 calculates the position orientation in the three-dimensional space of the grasping object 301 by using the orientation label and depth image of the grasping object 301. With respect to the position, it is calculated from the coordinates in the captured image where the grasping object 301 was observed and a value of the depth image corresponding to such coordinates. With respect to the orientation, the orientation corresponding to the orientation label of the grasping object 301 is obtained from the lookup table (not shown).

The learning unit 204 converts the grasping position orientation into a value of the target position orientation 440 by using the calculated position orientation of the grasping object 301. Specifically speaking, since the grasping position orientation is a position orientation in the coordinate system of the imaging unit 101, it is converted into a position orientation in the coordinate system of the grasping object 301.

The learning unit 204 further writes the grasping intensity of the grasping unit 102 at the time of the success of the grasping into the grasping unit set value 450, writes the type of grasping object 301 into the grasping object type label 420, and writes the label of the grasping unit into the grasping unit type label 430. The learning unit 204 writes a time required for the grasping into the priority 460. The learning unit 204 generates one grasping parameter element 410 to the success of the grasping of one time. Therefore, even if the user does not input any parameter, the grasping unit and the contents of the grasping operation are switched in accordance with the orientation of the grasping object and the optimum grasping operation can be executed.

According to the fourth embodiment, in the step in which the learning unit 204 performs the grasping learning, the grasping unit 102 generates parameters such as position orientation, grasping intensity, and the like for allowing the grasping unit 102 to grasp the grasping object and the grasping parameter setting unit 202 sets them. Therefore, even if the user does not input any parameter, the grasping parameter setting unit 202 can set the parameters.

Fifth Embodiment

In the fifth embodiment, an apparatus which can be applied to a case where, from objects such as a plurality of parts or the like disposed at arbitrary position orientations, the contents of the grasping operation are determined in accordance with a state of the object and the grasping is performed by using a grasping unit attached to a robot arm or the like will be described.

In the present embodiment, the captured image and depth image captured by the imaging unit are input and the recognizing unit detects at least one of the orientations of the grasping object. The grasping parameter setting unit sets the position orientation, grasping intensity, and the like, as parameters, for allowing the grasping unit to grasp the grasping object in accordance with the type of grasping object and the type of grasping unit. The operation generating unit compares the detected orientation with the previously defined grasping condition and determines the optimum grasping operation with reference to the parameters. A grasping possibility discriminating unit applies a physical simulation to the determined grasping operation and discriminates whether or not the grasping is successful. The grasping unit executes the determined grasping operation. Thus, the contents of the grasping operation are switched in accordance with the orientation of the grasping object and the grasping operation of a high certainty can be executed.

Figure 13:
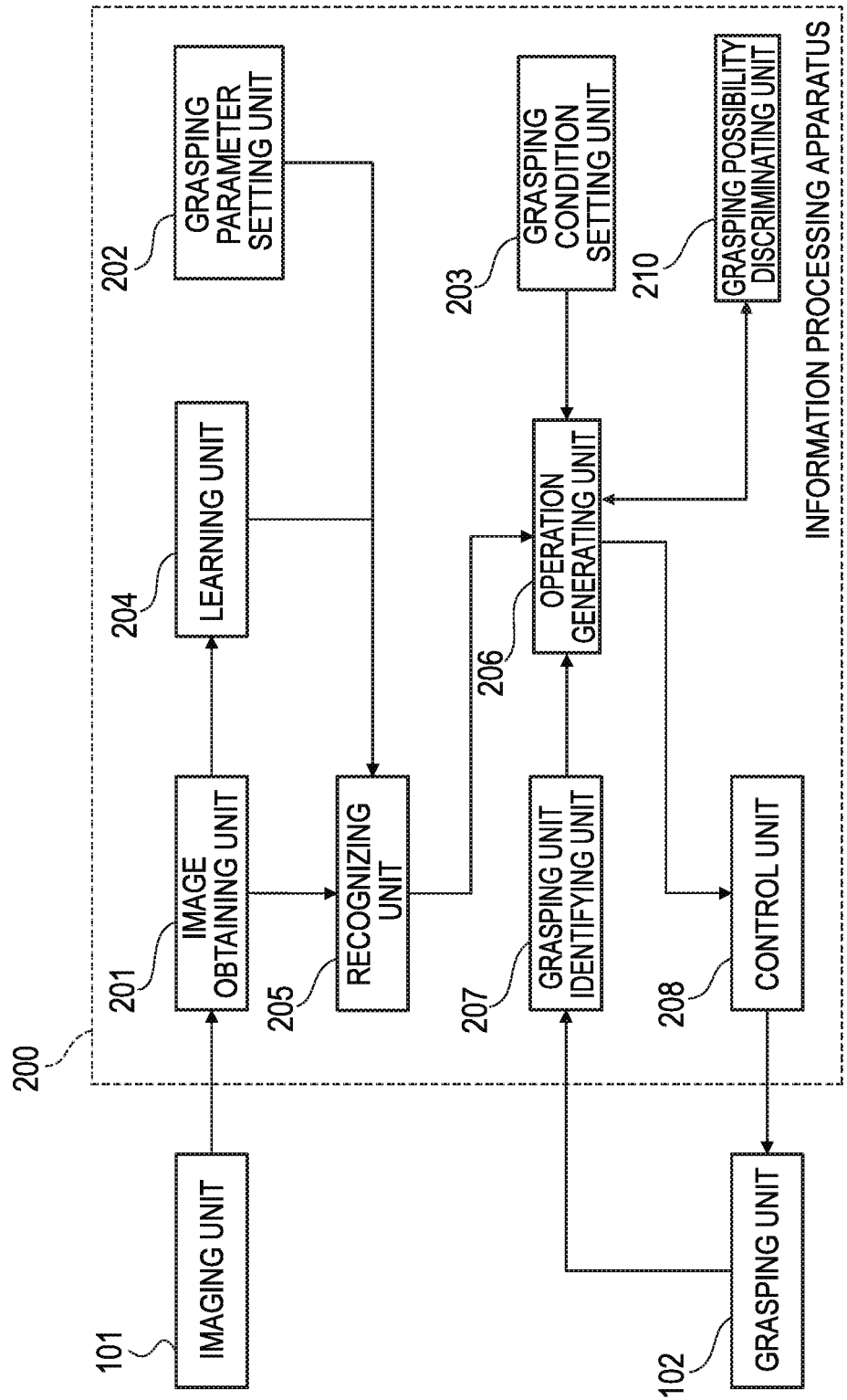
FIG. 13 is a diagram illustrating a whole construction of a grasping system of the fifth embodiment.

FIG. 13 is a diagram illustrating an example of a whole construction of a grasping system of the fifth embodiment.

In the grasping system of the embodiment, when comparing the whole construction of the grasping system of the second embodiment illustrated in FIG. 8, a grasping possibility discriminating unit 210 is added. A difference from the second embodiment will be described hereinbelow and a description about the same portions is properly omitted.

The grasping possibility discriminating unit 210 applies a physical simulation to the grasping operation generated by the operation generating unit 206 and discriminates whether or not the grasping operation is successful.

Subsequently, control of the information processing apparatus 200 in the embodiment will be described with reference to the flowchart of FIG. 5A. The flowchart of FIG. 5A is substantially the same as that in the second embodiment. However, since there is a difference of the contents of the process in each step, it will be described hereinbelow.

(S107)

The operation generating unit 206 outputs the generated operation definition table 601 illustrated in FIG. 7B to the grasping possibility discriminating unit 210.

By referring to the generated operation definition table 601 and the depth image, the grasping possibility discriminating unit 210 confirms an operation orbit within a range from a point where the grasping unit 102 grasps the grasping object 301 as an object of the grasping operation to a point where it releases the object at a target location. That is, the grasping possibility discriminating unit 210 discriminates whether or not the grasping unit 102 can grasp the grasping object 301 with reference to the operation definition table 601. Specifically speaking, the grasping possibility discriminating unit 210 discriminates whether or not, with respect to the set operation orbit, the robot arm 302 and the grasping unit 102 can complete the grasping operation without coming into contact with an obstacle such as another grasping object 301, supply tray 303, ejection tray 304, or the like. The grasping possibility discriminating unit 210 also discriminates whether or not the grasping object 301 can be stably held when the grasping object 301 is grasped by using the grasping unit set value 450. The grasping possibility discriminating unit 210 outputs a discrimination result to the operation generating unit 206.

When the discrimination result showing "grasping operation is unsuccessful (cannot grasp)" is output from the grasping possibility discriminating unit 210, the operation generating unit 206 generates a different grasping operation and makes the operation definition table 601 again. When the discrimination result showing "grasping operation is successful (can grasp)" is output from the grasping possibility discriminating unit 210, the operation generating unit 206 transmits the operation definition table 601 to the control unit 208. Therefore, the control unit 208 drives the grasping unit 102 on the basis of the operation definition table 601 to which the discrimination result showing "grasping operation is successful" has been output.

According to the fifth embodiment, the grasping possibility discriminating unit 210 applies the physical simulation to the decided grasping operation and discriminates whether or not the grasping unit 102 can grasp the grasping object. The control unit 208 drives the grasping unit 102 on the basis of the operation definition table 601 in which it was determined by the grasping possibility discriminating unit 210 that the grasping unit can grasp. Therefore, the grasping operation of a high certainty can be executed.

Definition

As an obtaining unit in the invention, any unit can be used so long as it can obtain the image captured by the imaging unit. Also as for the images which are input, any kinds of images such as RGB color image, gray scale image, monochromatic image, and the like. The image obtaining unit 201 corresponds to an example of the obtaining unit can be used.

To the specific grasping object and grasping unit, the setting unit in the invention defines and sets the presence or absence of the grasping operation and the convents of the associating operation by using the state of the grasping object which is detected as a condition. The grasping condition setting unit 203 corresponds to an example of the setting unit. In the first to fourth embodiments, the method in which the specific orientation of the grasping object is used as a condition has been described. In Modifications 2 and 3, such a construction that various kinds of conditions such as color, shape, material, and the like can be set has been described.

To the input of the captured image and depth image, the learning unit of the invention generates the recognition data for outputting the state of the grasping object. The learning unit 204 corresponds to an example of the learning unit. In the first to fourth embodiments, such a construction that in addition to the state of the grasping object, the control parameter for allowing the grasping unit to perform the grasping is further output has been described.

To the input of the captured image and depth image, the recognizing unit in the invention outputs the state of the grasping object on the basis of the recognition data generated by the learning unit. The recognizing unit 205 corresponds to an example of the recognizing unit. In the first to fourth embodiments, such a construction that the control parameter for allowing the grasping unit to perform the grasping is further output has been described.

The generating unit in the invention generates the grasping operation from the state of the grasping object which was output by the recognizing unit on the basis of the grasping condition set by the grasping condition setting unit. The operation generating unit 206 corresponds to an example of the generating unit. In the first embodiment, the method of generating the grasping operation by using the grasping learning has been described. In the second and third embodiments, the method of generating the grasping operation by the specific grasping object and the grasping target position orientation in the grasping unit which have been preset as parameters has been described.

The control unit in the invention generates the control command for allowing the grasping unit to actually execute the grasping operation from the grasping operation generated by the operation generating unit and drives the grasping unit. The control unit 208 corresponds to an example of the control unit.

Other Embodiments

The invention can be realized even by such a process that a program for realizing one or more functions of the foregoing embodiments is supplied to a system or an apparatus through a network or a storage medium and one or more processors in a computer of the system or apparatus reads out and executes the program. The invention can be also realized by a circuit (for example, ASIC) for realizing one or more functions.

Although the invention has been described above with respect to various kinds of embodiments, the invention is not limited only to those embodiments but various modifications or the like are possible within a scope of the invention. The foregoing embodiments may be properly combined.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-212900, filed Nov. 2, 2017, which is hereby incorporated by reference herein in its entirety.

What is claimed is:

1. An information processing apparatus comprising:
an obtaining unit configured to obtain an image of a plurality of objects, grasped by a grasping unit, by capturing the image with an imaging device;
a recognizing unit configured to individually recognize states of a plurality of objects from the image obtained by the obtaining unit; and
a generating unit configured to generate information for the grasping unit to preferentially execute the grasping operation of an object in a high-priority state which is predetermined based on the time required for an operation of changing an orientation of the object in a subsequent process of the grasping operation of the object in respective states of the object.

2. The information processing apparatus according to claim 1, wherein the generating unit is configured to discriminate whether or not the state of the object recognized by the recognizing unit satisfies the condition for which the priority is predetermined, and generate the information for allowing the grasping unit to execute the grasping operation on the basis of a discrimination result.

3. The information processing apparatus according to claim 1, wherein the generating unit is configured to discriminate whether or not the state of the object recognized by the recognizing unit satisfies the condition for which the priority is predetermined, and generate information for allowing the grasping unit to execute an associating operation before and after the grasping operation on the basis of a discrimination result.

4. The information processing apparatus according to claim 3, wherein the associating operation contains at least one of an operation for changing a position of the object and an operation for changing an orientation of the grasping unit.

5. The information processing apparatus according to claim 1, wherein:
the state of the object is an orientation of the object; and
in a case where the orientation of the object recognized by the recognizing unit is an orientation contained in the condition for which the priority is predetermined of the object, the generating unit is configured to generate the information for allowing the grasping unit to execute the grasping operation.

6. The information processing apparatus according to claim 1, wherein the state of the object contains at least one of a color, a pattern, a shape, and a material of the object.

7. The information processing apparatus according to claim 1, wherein the generating unit is configured to generate the information for allowing the grasping unit to execute the grasping operation on the basis of the state of the object recognized by the recognizing unit.

8. The information processing apparatus according to claim 1, wherein the generating unit is configured to discriminate whether or not at least one of a type of the grasping unit and a type of the object in addition to the state of the object recognized by the recognizing unit satisfies the condition for which the priority is predetermined, and generate the information for allowing the grasping unit to execute the grasping operation on the basis of a discrimination result.

9. The information processing apparatus according to claim 1, further comprising a setting unit configured to set grasping information for allowing the grasping unit to grasp the object, wherein
the generating unit is configured to generate the information for allowing the grasping unit to execute the grasping operation on the basis of the grasping information set by the setting unit.

10. The information processing apparatus according to claim 1, further comprising a control unit configured to drive the grasping unit on the basis of the information for allowing the grasping unit to execute the grasping operation, wherein
the control unit is configured to control so as to change the grasping unit to the grasping unit of a type of high priority on the basis of information in which a type and a priority of the grasping unit have been made to correspond.

11. The information processing apparatus according to claim 1, further comprising:
a control unit configured to drive the grasping unit on the basis of the information for allowing the grasping unit to execute the grasping operation; and
a discriminating unit configured to discriminate whether or not the grasping unit can grasp on the basis of the information for allowing the grasping unit to execute the grasping operation which was generated by the generating unit, wherein
the control unit is configured to drive the grasping unit on the basis of the information for allowing the grasping unit to execute the grasping operation which was determined by the discriminating unit that the grasping unit can grasp.

12. The information processing apparatus according to claim 1, further comprising a learning unit configured to make the image acquired by capturing the object correspond to the state of the object, wherein
the recognizing unit is configured to recognize the state of the object from the image obtained by the obtaining unit on the basis of information which was made to correspond by the learning unit.

13. The information processing apparatus according to claim 1, wherein the condition of high priority is such a condition that a required time of the associating operation which is executed before and after the grasping operation is short.

14. The information processing apparatus according to claim 1, wherein:
the conditions to execute the grasping operation contain a grasping intensity showing an intensity of the grasping operation; and
the generating unit is configured to generate the grasping intensity for allowing the grasping unit to execute the grasping operation on the basis of the state of the object recognized by the recognizing unit and the predetermined condition of high priority among the conditions to execute the grasping operation.

15. A grasping system comprising:
an information processing apparatus comprising:
an obtaining unit configured to obtain an image of a plurality of objects, grasped by a grasping unit, by capturing the image with an imaging device;
a recognizing unit configured to individually recognize states of a plurality of objects from the image obtained by the obtaining unit; and a generating unit configured to generate information for the grasping unit to preferentially execute the grasping operation of an object in a high-priority state which is predetermined based on the time required for an operation of changing an orientation of the object in a subsequent process of the grasping operation of the object in respective states of the object, the grasping system further comprising:

the imaging device configured to capture the image of the plurality of objects; and the grasping unit.

16. An information processing method comprising:

obtaining an image of a plurality of objects, grasped by a grasping unit, by capturing the image with an imaging device;

individually recognizing states of a plurality of objects from the image obtained in the obtaining step; and generating information for the grasping unit to preferentially execute the grasping operation of an object in a high-priority state which is predetermined based on the time required for an operation of changing an orientation of the object in a subsequent process of the grasping operation of the object in respective states of the object.

17. The information processing method according to claim 16, wherein, in the generation, it is discriminated whether or not the recognized state of the object satisfies the condition for which the priority is predetermined, and the information for allowing the grasping unit to execute the grasping operation is generated on the basis of a discrimination result.

18. The information processing method according to claim 16, wherein, in the generation, it is discriminated whether or not the recognized state of the object satisfies the condition for which the priority is predetermined, and information for allowing the grasping unit to execute an associating operation before and after the grasping operation is generated on the basis of a discrimination result.

19. The information processing method according to claim 16, wherein:

the state of the object is an orientation of the object; and in generation, in a case where the orientation of the recognized object is an orientation contained in the conditions to execute the grasping operation of the object, the information for allowing the grasping unit to execute the grasping operation is generated.

20. A non-transitory computer-readable storage medium holding a program for execution by an information processing apparatus, the program comprising the steps of:

obtaining an image of a plurality of objects, grasped by a grasping unit, by capturing the image with an imaging device;

individually recognizing states of a plurality of objects from the image obtained in the obtaining step; and generating information for the grasping unit to preferentially execute the grasping operation of an object in a high-priority state which is predetermined based on the time required for an operation of changing an orientation of the object in a subsequent process of the grasping operation of the object in respective states of the object.

* * * * *